United States Patent
Inoue et al.

(10) Patent No.: US 8,178,254 B2
(45) Date of Patent: May 15, 2012

(54) CELL FOR SOLID OXIDE FUEL CELL AND METHOD FOR MANUFACTURING SAME

(75) Inventors: Shuichi Inoue, Osaka (JP); Hidemasa Nonaka, Osaka (JP); Satoru Uenoyama, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 854 days.

(21) Appl. No.: 12/160,953

(22) PCT Filed: Jan. 16, 2007

(86) PCT No.: PCT/JP2007/050496
§ 371 (c)(1),
(2), (4) Date: Nov. 10, 2008

(87) PCT Pub. No.: WO2007/083627
PCT Pub. Date: Jul. 26, 2007

(65) Prior Publication Data
US 2010/0178587 A1 Jul. 15, 2010

(30) Foreign Application Priority Data

Jan. 17, 2006 (JP) ................................. 2006-008714
Mar. 31, 2006 (JP) ................................. 2006-096634
Sep. 12, 2006 (JP) ................................. 2006-246862

(51) Int. Cl.
*H01M 8/02* (2006.01)
*H01M 8/12* (2006.01)
*H01M 8/24* (2006.01)

(52) U.S. Cl. .................. 429/465; 429/468; 429/535

(58) Field of Classification Search .................. 429/465, 429/468, 495, 497, 533, 535
See application file for complete search history.

(56) References Cited

U.S. PATENT DOCUMENTS

| 7,122,264 | B2 * | 10/2006 | Nishi et al. ................... 429/535 |
| 7,297,436 | B2 * | 11/2007 | Hori .......................... 429/533 X |
| 7,351,487 | B2 * | 4/2008 | Yamashita et al. ........ 429/495 X |
| 7,390,582 | B2 | 6/2008 | Tietz et al. |
| 2006/0193971 | A1 | 8/2006 | Tietz et al. |

FOREIGN PATENT DOCUMENTS

| CA | 2240270 A1 | 6/1997 |
| DE | 10050010 A1 | 4/2002 |
| DE | 10306647 A1 | 9/2004 |
| JP | 9306514 A | 11/1997 |

(Continued)

OTHER PUBLICATIONS

Fujita et al.; "Prevention of SOFC Cathode Degradation in Contact With Cr-containing Alloy"; Journal of Power Sources; May 14, 2004; pp. 261-269; vol. 131; No. 1-2.

(Continued)

*Primary Examiner* — Stephen J. Kalafut
(74) *Attorney, Agent, or Firm* — The Webb Law Firm

(57) ABSTRACT

There is provided an SOFC cell and manufacturing method thereof whereby the occurrence of Cr poisoning of the air electrode can be satisfactorily suppressed in an SOFC cell formed by joining together an air electrode with a Cr-containing alloy or the like. A Cr(VI) oxide suppressing state is induced for suppressing the formation of Cr(VI) oxides in an alloy or oxide during a firing process in which an alloy or oxide and an air electrode are fired in a state of being joined together.

12 Claims, 19 Drawing Sheets

FOREIGN PATENT DOCUMENTS

| | | |
|---|---|---|
| JP | 11-501764 | 2/1999 |
| JP | 11073975 A | 3/1999 |
| JP | 11-307114 | 11/1999 |
| JP | 2001-196077 | 7/2001 |
| JP | 2004-235060 | 8/2004 |
| JP | 2004-259643 | 9/2004 |
| WO | 96/28855 | 9/1996 |
| WO | 2004075325 A1 | 9/2004 |

OTHER PUBLICATIONS

Hilpert et al.; "Chromium Vapor Species over Solid Oxide Fuel Cell Interconnect Materials and Their Potential for Degradation Processes"; Journal of the Electrochemical Society; Nov. 1996; pp. 3642-3647; vol. 143, No. 11.

* cited by examiner

FIG.3
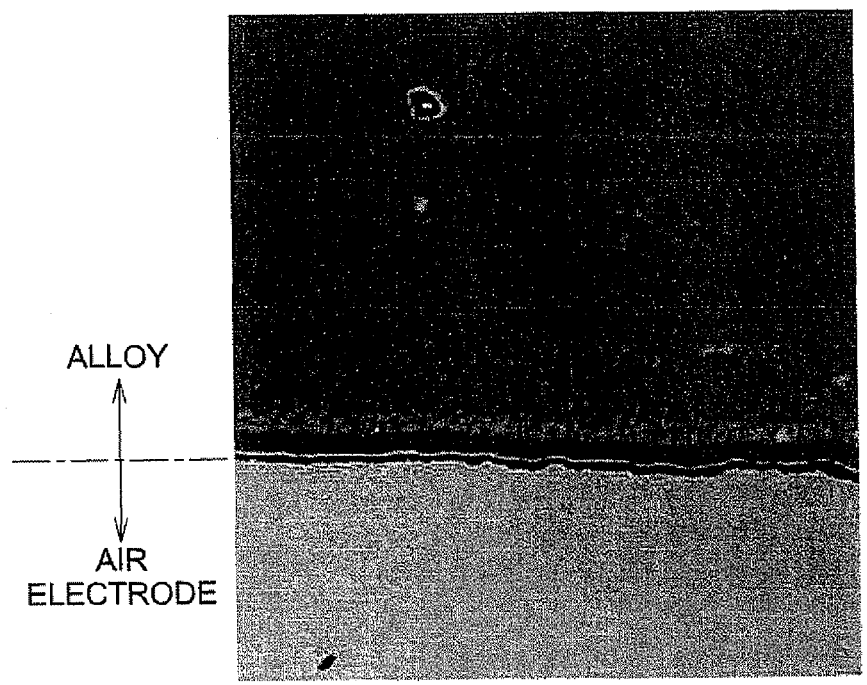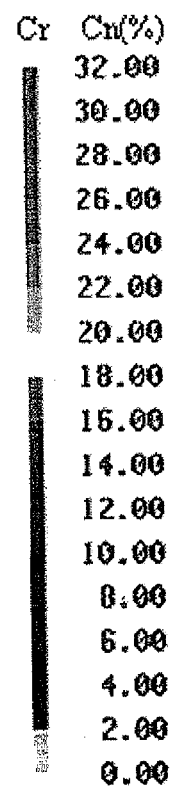
FIG.4
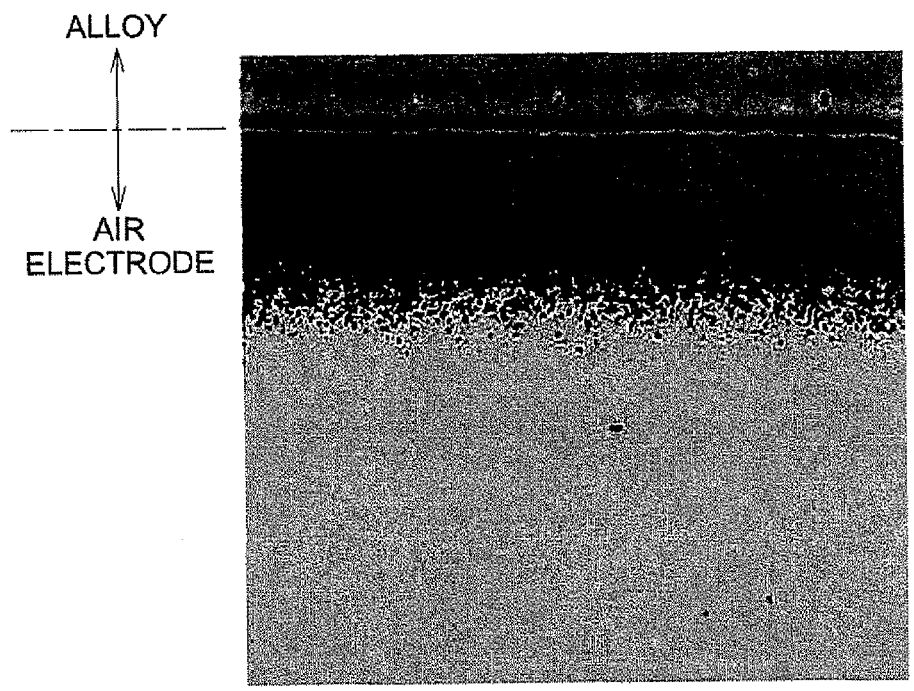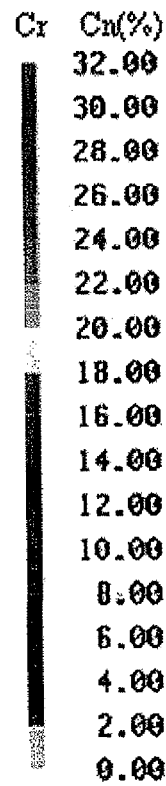

FIG.5
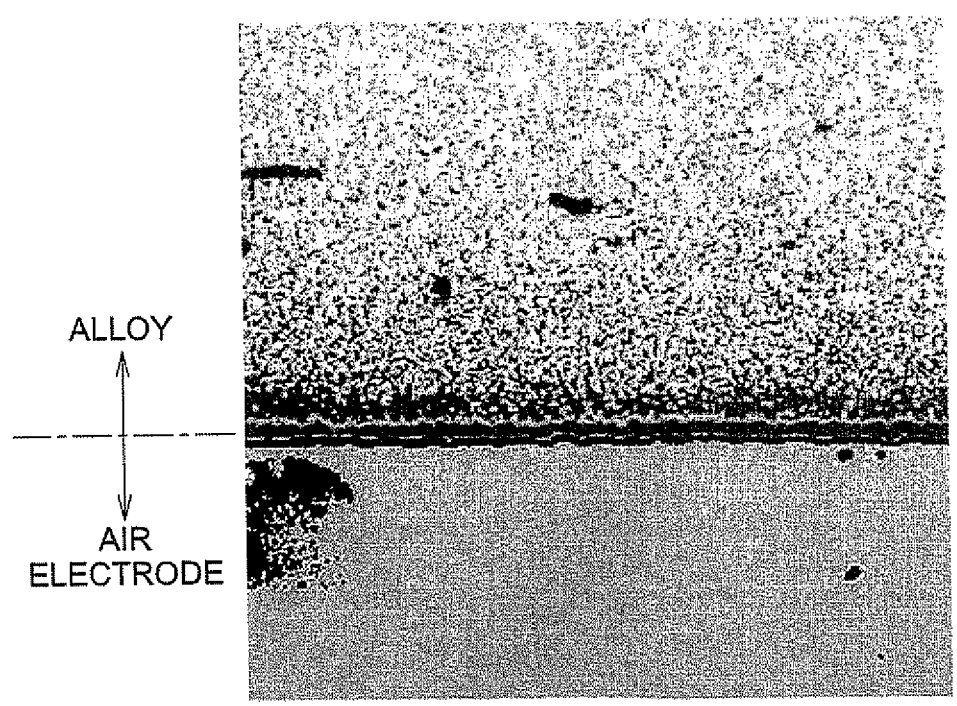
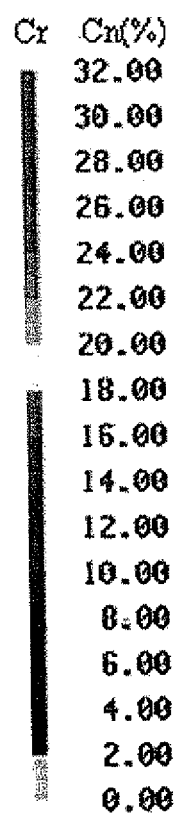
FIG.6
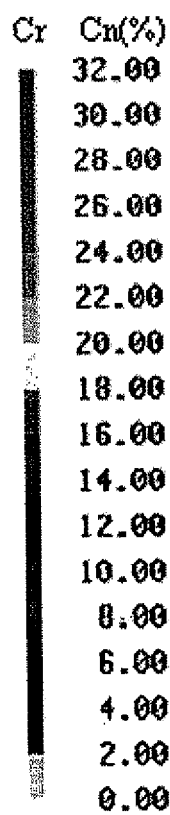

FIG.10
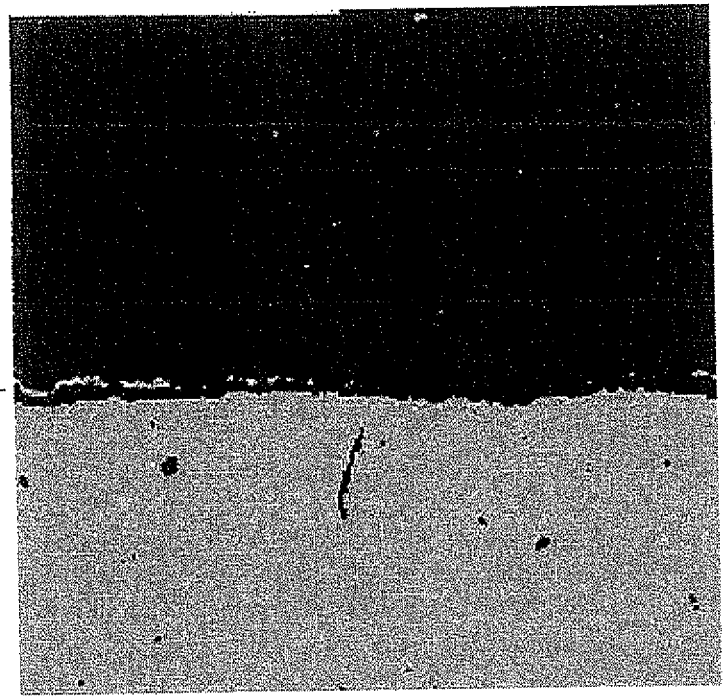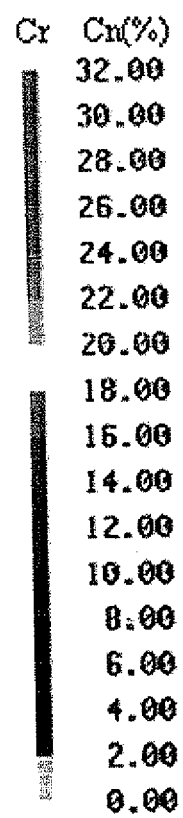
FIG.11
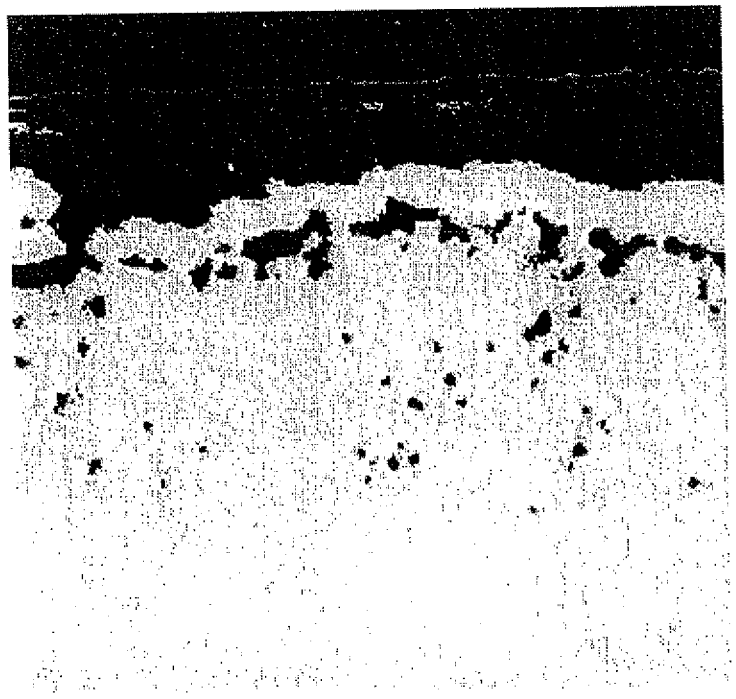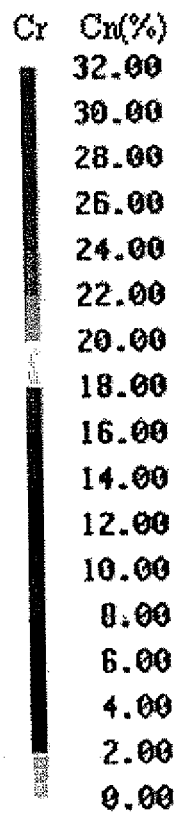

FIG.12
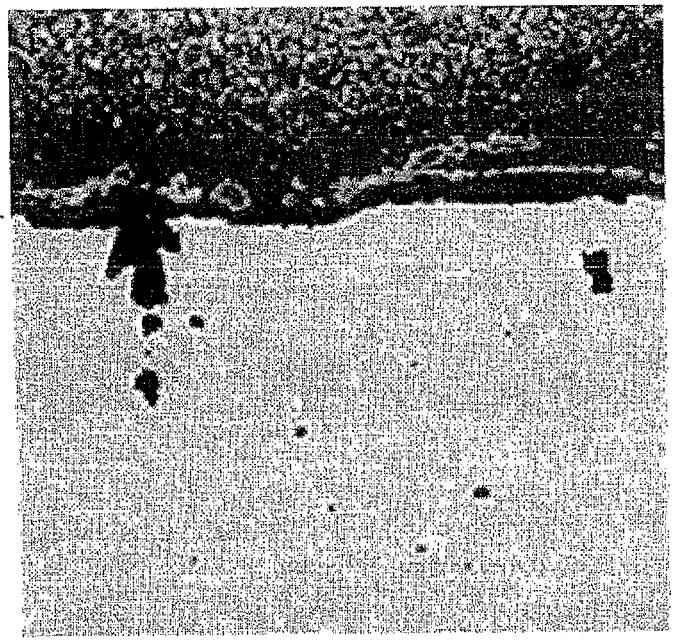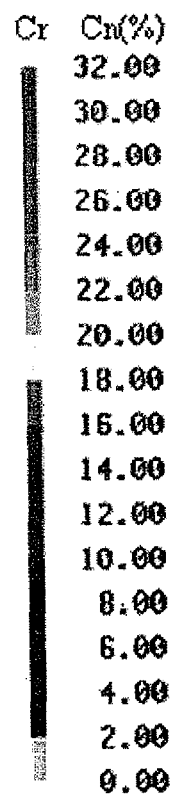
FIG.13
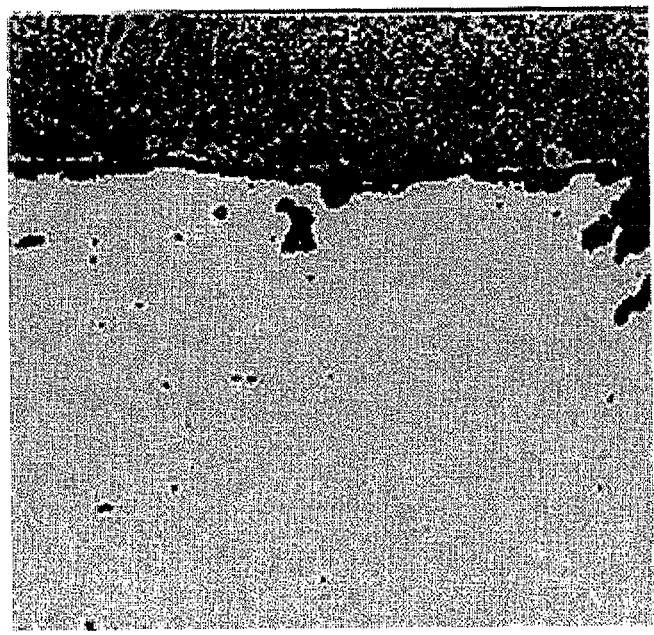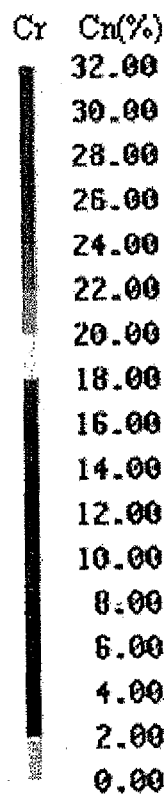

FIG.15
(a)
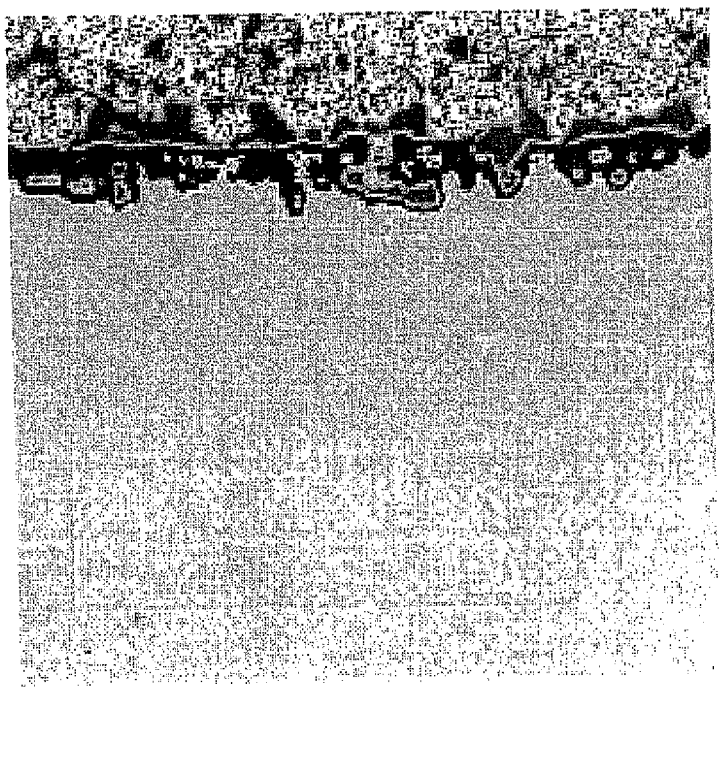
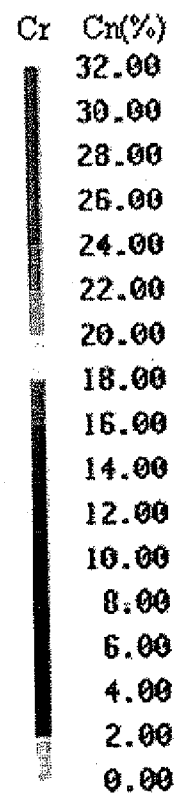
(b)
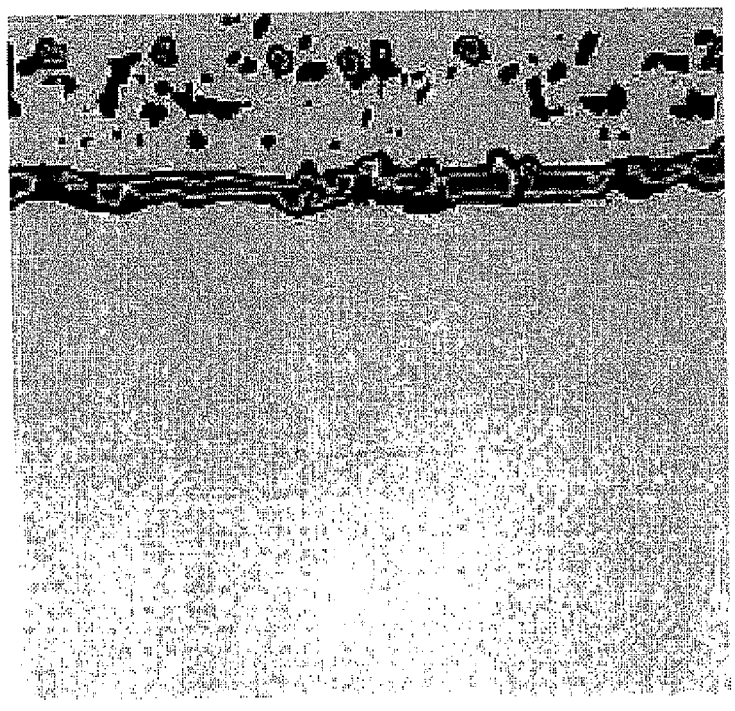
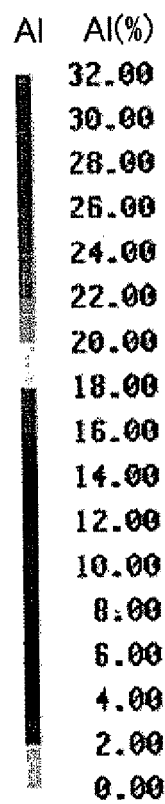

FIG.16
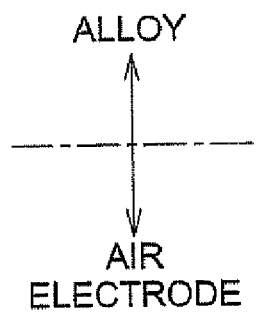
ALLOY
AIR ELECTRODE
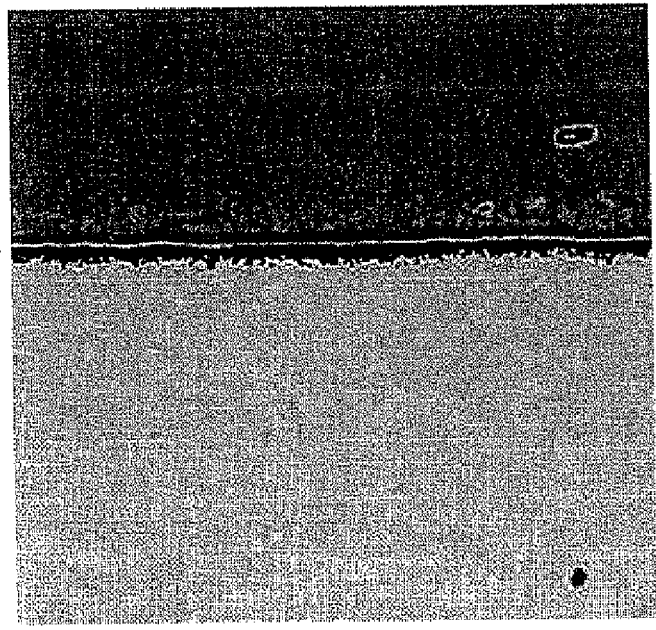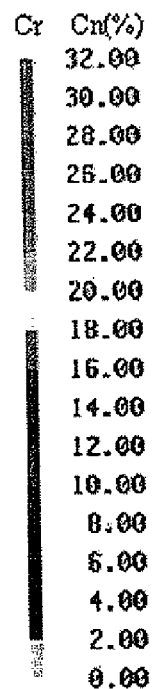
FIG.17
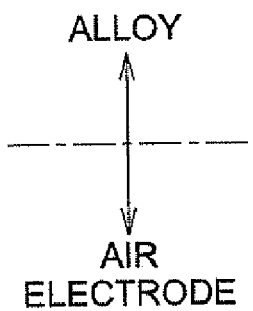
ALLOY
AIR ELECTRODE
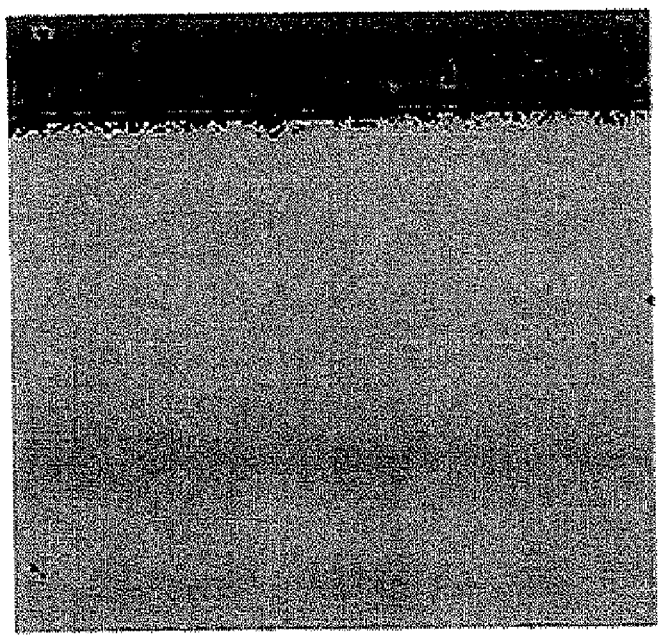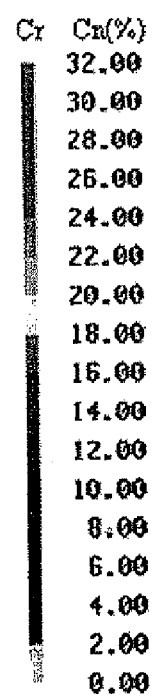

ALLOY / AIR ELECTRODE

ALLOY / AIR ELECTRODE

FIG.28

| ELECTRODE REACTION | E°/V | PRESENCE OF Cr POISONING |
|---|---|---|
| $Ag^+ + e^- \Leftrightarrow Ag$ | 0.7991 | POISONING PRESENT |
| $Cu^{2+} + e^- \Leftrightarrow Cu^+$ | 0.159 | POISONING PRESENT |
| $Sn^{4+} + 2e^- \Leftrightarrow Sn^{2+}$ | 0.15 | POISONING PRESENT |
| $2WO_3 + 2H^+ + 2e^- \Leftrightarrow W_2O_5 + H_2O$ | -0.029 | NO POISONING |
| $TiO_2 + 4H^+ + e^- \Leftrightarrow Ti^{3+} + 2H_2O$ | -0.666 | NO POISONING |
| $Al^{3+} + 3e^- \Leftrightarrow Al$ | -1.676 | NO POISONING |
| $Y^{3+} + 3e^- \Leftrightarrow Y$ | -2.37 | NO POISONING |

FIG.29

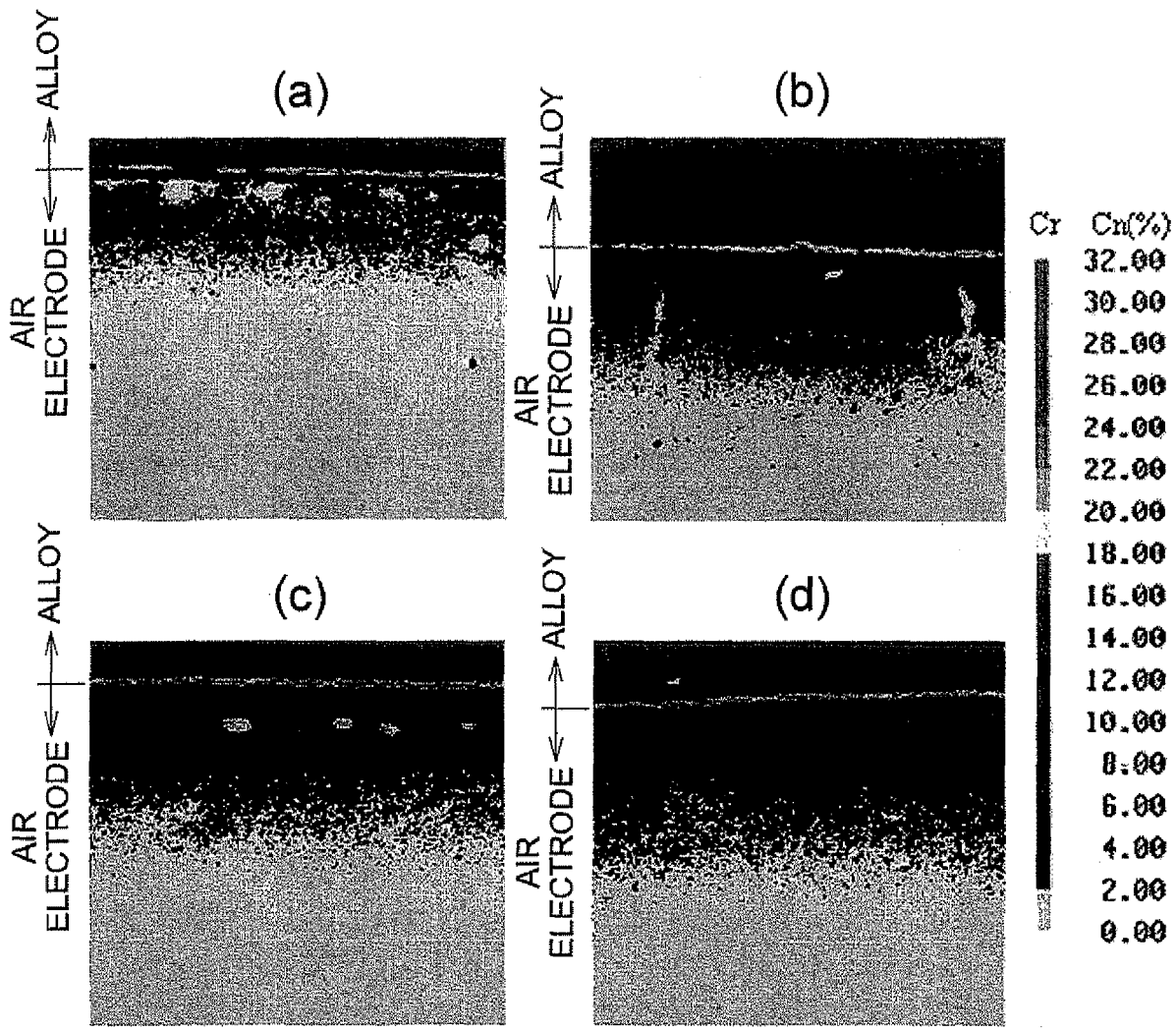

CELL FOR SOLID OXIDE FUEL CELL AND METHOD FOR MANUFACTURING SAME

TECHNICAL FIELD

The present invention relates to a method for manufacturing a cell for a solid oxide fuel cell (hereinafter referred to as "SOFC" as appropriate), the method comprising a firing process in which an air electrode and an alloy or oxide (sometimes referred to hereinafter as an "alloy or the like") containing Cr (chromium) in a state of being joined together are fired, and to an SOFC cell manufactured by the manufacturing method.

BACKGROUND ART

The SOFC cell has a structure in which a single cell formed by joining the air electrode to one surface of an electrolyte film, and joining a fuel electrode to the other surface of the same electrolyte film is sandwiched by a pair of electron-conductive alloys or the like for transferring electrons with respect to the air electrode or the fuel electrode.

In such an SOFC cell, for example, the cell operates at an operating temperature of about 700 to 900° C., electromotive force is generated between the pair of electrodes in conjunction with the movement of oxide ions from the air electrode towards the fuel electrode via the electrolyte film, and the electromotive force can be brought out to the outside and utilized.

The alloy used in such an SOFC cell is fabricated from a Cr-containing material having excellent electron conductivity and thermal resistance (oxidation resistance). The thermal resistance (oxidation resistance) of such an alloy originates from the dense coating of chromia ($Cr_2O_3$) formed on the surface of the alloy.

In the process for manufacturing the SOFC cell, a firing treatment is sometimes performed for firing the fuel electrode, the air electrode, the alloy, or the like in a stacked state at a firing temperature of about 1000° C. to 1250° C., which is higher than the operating temperature, in order to minimize the contact resistance between the fuel electrode or air electrode, and the alloy or the like (see Patent Document 1, for example).

[Patent Document 1] Japanese Laid-open Patent Application No. 2004-259643

DISCLOSURE OF THE INVENTION

Problems that the Invention is Intended to Solve

In an SOFC cell formed by joining together an air electrode and a Cr-containing alloy or the like as described above, the alloy or the like is exposed to high temperatures during operation and at other times, whereby the Cr contained in the alloy or the like scatters towards the air electrode, and the problem of Cr poisoning of the air electrode occurs.

Such Cr poisoning of the air electrode inhibits the reduction of oxygen to oxide ions in the air electrode, increases the electrical resistance of the air electrode, and also reduces the Cr concentration of the alloy or the like, thereby causing deterioration of oxidation resistance of the alloy or the like as such, and other problems. The performance of the SOFC can be deteriorated as a result.

Furthermore, Cr(VI) oxides (Cr having a valence of 6+ will be referred to hereinafter as "Cr(VI)") are sometimes formed by exposure to firing temperatures higher than the operating temperature when firing is performed in a state in which the air electrode and the alloy or the like are joined together during SOFC manufacture. The oxides evaporate and react with the air electrode, Cr compounds are formed, and Cr poisoning of the air electrode occurs. In this firing process, minimizing the oxygen partial pressure in a vacuum or inert gas atmosphere or the like makes it possible to suppress oxidation of chromia ($Cr_2O_3$) to Cr(VI) on the surface of the alloy, or oxidation of Cr(III) (Cr having a valence of 3+ will be referred to hereinafter as "Cr(III)") to Cr(VI) of the oxide on the surface of the alloy or the like. Even when the occurrence of Cr poisoning mentioned above is suppressed during manufacturing, the air fed to the air electrode is exposed to high temperatures by the oxidizing atmosphere present during subsequent operation, whereby oxidation to Cr(VI) progresses, and the abovementioned Cr poisoning sometimes occurs.

The present invention was developed in view of the problems described above, and an object of the present invention is to provide an SOFC cell whereby the occurrence of Cr poisoning of the air electrode can be satisfactorily suppressed in an SOFC cell formed by joining together an air electrode with a Cr-containing alloy or the like, and to provide a method for manufacturing the same.

Means for Solving the Problems

In the method for manufacturing an SOFC cell according to the present invention for achieving the above-mentioned objects, an air electrode and a Cr-containing alloy or oxide are joined together, a first aspect of the method for manufacturing a cell for a solid oxide fuel cell being that in a firing process in which the air electrode and the alloy or oxide are fired in a state of being joined together, a Cr(VI) oxide suppressing state is induced for suppressing the occurrence of an oxide of Cr(VI) in the alloy or oxide.

According to the first aspect described above, the abovementioned Cr(VI) oxide suppressing state is induced in the Cr-containing alloy or the like when the firing process is performed during manufacturing of the SOFC cell, whereby diffusion of vapor-phase Cr(VI) oxides (or oxyhydroxides) from the alloy or the like to the air electrode or the boundary between the air electrode and the electrolyte is suppressed, and the occurrence of Cr poisoning of the air electrode can be satisfactorily suppressed.

According to a second aspect of the method for manufacturing an SOFC cell according to the present invention the Cr(VI) oxide suppressing state is induced by performing a coating process whereby an n-type semiconductor coating composed of an oxide in which a standard free energy of formation is equal to or less than that of $WO_3$ is formed on a surface of the alloy or oxide prior to performing the firing process.

According to the second aspect described above, the abovementioned coating process is performed prior to the firing process during manufacturing of the SOFC cell, and a minimally oxidative n-type semiconductor coating is formed on the surface of the alloy or the like, whereby the equilibrium dissociation pressure of the oxygen partial pressure at the boundary between the n-type semiconductor coating and the alloy or the like is made extremely small, and the Cr included in the alloy or the like can be made unlikely to oxidize to Cr(VI). Even when an oxide of Cr(III) is formed under the minimally oxidative n-type semiconductor coating, a Cr(VI) oxide suppressing state can at least be induced for suppressing the occurrence of Cr(VI) oxides, and the occurrence of Cr poisoning of the air electrode can be satisfactorily suppressed in the firing process subsequent to the abovementioned coating process. Furthermore, by forming the minimally oxidative n-type semiconductor coating on the alloy or the like in this manner, the occurrence of Cr(VI) oxides can be suppressed during operation as well as during the firing process, and the progression of Cr poisoning of the air electrode can therefore also be satisfactorily prevented. Since decrease of the Cr content of the alloy or the like can also be suppressed, the thermal resistance of the alloy or the like as such can also be maintained at a satisfactory level.

Specifically, the effects described above can be estimated to be obtainable because an oxide in which the standard free energy of formation of the oxide is equal to or lower than that of $WO_3$ at the operating temperature has minimal oxidative ability as the n-type semiconductor coating, and can suppress oxidation from Cr(III) to Cr(VI).

The SOFC cell according to the present invention for achieving the abovementioned objects is a cell for a solid oxide fuel cell in which an air electrode and a Cr-containing alloy or oxide are joined together, wherein another aspect of the fuel cell is that an n-type semiconductor coating composed of an oxide in which a standard free energy of formation is equal to or less than that of $WO_3$ is formed on a surface of the alloy or oxide.

According to this aspect of the SOFC cell according to the present invention, the same structure is adopted as in the SOFC cell manufactured by the method for manufacturing an SOFC cell according to the abovementioned second aspect, and the same operational effects can therefore be demonstrated.

A third aspect of the method for manufacturing an SOFC cell according to the present invention is that the Cr(VI) oxide suppressing state is induced by performing a coating process whereby an n-type semiconductor coating composed of an oxide in which a standard electrode potential in an aqueous solution is –0.029 V or lower is formed on a surface of the alloy or oxide prior to performing the firing process.

In the same manner as in the abovementioned second aspect, according to the third aspect described above, the occurrence of Cr(VI) oxides can be suppressed during operation or during the firing process subsequent to the abovementioned coating process, and Cr poisoning of the air electrode can be satisfactorily prevented. Since decrease of the Cr content of the alloy or the like can also be suppressed, the thermal resistance of the alloy or the like as such can also be maintained at a satisfactory level.

Specifically, the effects described above can be estimated to be obtainable because an oxide in which the standard electrode potential in an aqueous solution is –0.029 V or lower has minimal oxidative ability as the n-type semiconductor coating, and can suppress oxidation from Cr(III) to Cr(VI).

The SOFC cell according to the present invention for achieving the abovementioned objects is also a cell for, a solid oxide fuel cell in which an air electrode and a Cr-containing alloy or oxide are joined together, wherein another aspect of the fuel cell is that an n-type semiconductor coating composed of an oxide in which a standard electrode potential in an aqueous solution is –0.029 V or lower is formed on a surface of the alloy or oxide.

According to this aspect of the SOFC cell according to the present invention, the same structure is adopted as in the SOFC cell manufactured by the method for manufacturing an SOFC cell according to the abovementioned third aspect, and the same operational effects can therefore be demonstrated.

A fourth aspect of the method for manufacturing an SOFC cell according to the present invention is that the n-type semiconductor coating formed in the coating process is a $TiO_2$ coating.

According to the abovementioned fourth aspect, by making the n-type semiconductor coating formed on the alloy or the like in the coating process into a $TiO_2$ coating, the equilibrium dissociation pressure of the oxygen partial pressure in the boundary between the $TiO_2$ coating and the alloy or the like can be made extremely small ($10^{-26}$ atm or less at 1000° C.), and a Cr(VI) oxide suppressing state can be induced that can more satisfactorily suppress the formation of Cr(VI) oxides.

The SOFC cell according to the present invention for achieving the abovementioned objects is also a cell for a solid oxide fuel cell in which an air electrode and a Cr-containing alloy or oxide are joined together, wherein another aspect of the fuel cell is that a $TiO_2$ coating or other n-type semiconductor coating is formed on a surface of the alloy or oxide.

According to this aspect of the SOFC cell according to the present invention, the same structure is adopted as in the SOFC cell manufactured by the method for manufacturing an SOFC cell according to the abovementioned fourth aspect, whereby the occurrence of Cr poisoning of the air electrode can be satisfactorily suppressed, both during the firing process and during operation, by the $TiO_2$ coating or other minimally oxidative n-type semiconductor coating formed on the surface of the alloy or the like.

A fifth aspect of the method for manufacturing an SOFC cell according to the present invention is that the n-type semiconductor coating formed in the coating process is a $Y_2O_3$ coating.

According to the abovementioned fifth aspect, by making the n-type semiconductor coating formed on the alloy or the like in the coating process into a $Y_2O_3$ coating, the equilibrium dissociation pressure of the oxygen partial pressure in the boundary between the $Y_2O_3$ coating and the alloy or the like can be made extremely small ($10^{-40}$ atm or less at 1000° C.), and a Cr(VI) oxide suppressing state can be induced that can more satisfactorily suppress the formation of Cr(VI) oxides.

The SOFC cell according to the present invention for achieving the abovementioned objects is also a cell for a solid oxide fuel cell in which an air electrode and a Cr-containing alloy or oxide are joined together, wherein another aspect of the fuel cell is that a $Y_2O_3$ coating or other n-type semiconductor coating is formed on a surface of the alloy or oxide.

According to this aspect of the SOFC cell according to the present invention, the same structure is adopted as in the SOFC cell manufactured by the method for manufacturing an SOFC cell according to the abovementioned fifth aspect, whereby the occurrence of Cr poisoning of the air electrode can be satisfactorily suppressed, both during the firing process and during operation, by the $Y_2O_3$ coating or other minimally oxidative n-type semiconductor coating formed on the surface of the alloy or the like.

A sixth aspect of the method for manufacturing an SOFC cell according to the present invention is that the n-type semiconductor coating formed in the coating process is a $WO_3$ coating.

According to the abovementioned sixth aspect, by making the n-type semiconductor coating formed on the alloy or the like in the coating process into a $WO_3$ coating, the equilibrium dissociation pressure of the oxygen partial pressure in the boundary between the $WO_3$ coating and the alloy or the like can be made extremely small ($10^{-12}$ atm or less at 1000° C.), and a Cr(VI) oxide suppressing state can be induced that can more satisfactorily suppress the formation of Cr(VI) oxides.

The SOFC cell according to the present invention for achieving the abovementioned objects is also a cell for a solid oxide fuel cell in which an air electrode and a Cr-containing alloy or oxide are joined together, wherein another aspect of the fuel cell is that a $WO_3$ coating or other n-type semiconductor coating is formed on a surface of the alloy or oxide.

According to this aspect of the SOFC cell according to the present invention, the same structure is adopted as in the SOFC cell manufactured by the method for manufacturing an SOFC cell according to the abovementioned sixth aspect, whereby the occurrence of Cr poisoning of the air electrode can be satisfactorily suppressed, both during the firing process and during operation, by the $WO_3$ coating or other minimally oxidative n-type semiconductor coating formed on the surface of the alloy or the like.

A seventh aspect of the method for manufacturing an SOFC cell according to the present invention is that the n-type semiconductor coating formed in the coating process is a $SiO_2$ coating.

According to the abovementioned seventh aspect, by making the n-type semiconductor coating formed on the alloy or the like in the coating process into a $SiO_2$ coating, the equilibrium dissociation pressure of the oxygen partial pressure in the boundary between the $SiO_2$ coating and the alloy or the like can be made extremely small ($10^{-26}$ atm or less at 1000° C.), and a Cr(VI) oxide suppressing state can be induced that can more satisfactorily suppress the formation of Cr(VI) oxides.

The SOFC cell according to the present invention for achieving the abovementioned objects is also a cell for a solid oxide fuel cell in which an air electrode and a Cr-containing alloy or oxide are joined together, wherein another aspect of the fuel cell is that a $SiO_2$ coating or other n-type semiconductor coating is formed on a surface of the alloy or oxide.

According to this aspect of the SOFC cell according to the present invention, the same structure is adopted as in the SOFC cell manufactured by the method for manufacturing an SOFC cell according to the abovementioned seventh aspect, whereby the occurrence of Cr poisoning of the air electrode can be satisfactorily suppressed, both during the firing process and during operation, by the $SiO_2$ coating or other minimally oxidative n-type semiconductor coating formed on the surface of the alloy or the like.

An eighth aspect of the method for manufacturing an SOFC cell according to the present invention is that the n-type semiconductor coating formed in the coating process is a $CaTiO_3$ coating.

According to the abovementioned eighth aspect, by making the n-type semiconductor coating formed on the alloy or the like in the coating process into a $CaTiO_3$ coating, the equilibrium dissociation pressure of the oxygen partial pressure in the boundary between the $CaTiO_3$ coating and the alloy or the like can be made extremely small ($10^{-26}$ atm or less at 1000° C.), and a Cr(VI) oxide suppressing state can be induced that can more satisfactorily suppress the formation of Cr(VI) oxides.

The SOFC cell according to the present invention for achieving the abovementioned objects is also a cell for a solid oxide fuel cell in which an air electrode and a Cr-containing alloy or oxide are joined together, wherein another aspect of the fuel cell is that a $CaTiO_3$ coating or other n-type semiconductor coating is formed on a surface of the alloy or oxide.

According to this aspect of the SOFC cell according to the present invention, the same structure is adopted as in the SOFC cell manufactured by the method for manufacturing an SOFC cell according to the abovementioned eighth aspect, whereby the occurrence of Cr poisoning of the air electrode can be satisfactorily suppressed, both during the firing process and during operation, by the $CaTiO_3$ coating or other minimally oxidative n-type semiconductor coating formed on the surface of the alloy or the like.

A ninth aspect of the method for manufacturing an SOFC cell according to the present invention is that the n-type semiconductor coating formed in the coating process is a $BaTiO_3$ coating.

According to the abovementioned ninth aspect, by making the n-type semiconductor coating formed on the alloy or the like in the coating process into a $BaTiO_3$ coating, the equilibrium dissociation pressure of the oxygen partial pressure in the boundary between the $BaTiO_3$ coating and the alloy or the like can be made extremely small ($10^{-26}$ atm or less at 1000° C.), and a Cr(VI) oxide suppressing state can be induced that can more satisfactorily suppress the formation of Cr(VI) oxides.

The SOFC cell according to the present invention for achieving the abovementioned objects is also a cell for a solid oxide fuel cell in which an air electrode and a Cr-containing alloy or oxide are joined together, wherein another aspect of the fuel cell is that a $BaTiO_3$ coating or other n-type semiconductor coating is formed on a surface of the alloy or oxide.

According to this aspect of the SOFC cell according to the present invention, the same structure is adopted as in the SOFC cell manufactured by the method for manufacturing an SOFC cell according to the abovementioned ninth aspect, whereby the occurrence of Cr poisoning of the air electrode can be satisfactorily suppressed, both during the firing process and during operation, by the $BaTiO_3$ coating or other minimally oxidative n-type semiconductor coating formed on the surface of the alloy or the like.

A tenth aspect of the method for manufacturing an SOFC cell according to the present invention is that the n-type semiconductor coating formed in the coating process is a $Sm_2O_3$ coating.

According to the abovementioned tenth aspect, by making the n-type semiconductor coating formed on the alloy or the like in the coating process into a $Sm_2O_3$ coating, the equilibrium dissociation pressure of the oxygen partial pressure in the boundary between the $Sm_2O_3$ coating and the alloy or the like can be made extremely small ($10^{-37}$ atm or less at 1000° C.), and a Cr(VI) oxide suppressing state can be induced that can more satisfactorily suppress the formation of Cr(VI) oxides.

The SOFC cell according to the present invention for achieving the abovementioned objects is also a cell for a solid oxide fuel cell in which an air electrode and a Cr-containing alloy or oxide are joined together, wherein another aspect of the fuel cell is that a $Sm_2O_3$ coating or other n-type semiconductor coating is formed on a surface of the alloy or oxide.

According to, this aspect of the SOFC cell according to the present invention, the same structure is adopted as in the SOFC cell manufactured by the method for manufacturing an SOFC cell according to the abovementioned tenth aspect, whereby the occurrence of Cr poisoning of the air electrode can be satisfactorily suppressed, both during the firing process and during operation, by the $Sm_2O_3$ coating or other minimally oxidative n-type semiconductor coating formed on the surface of the alloy or the like.

An eleventh aspect of the method for manufacturing an SOFC cell according to the present invention is that the n-type semiconductor coating formed in the coating process is a $MgTiO_3$ coating.

According to the abovementioned eleventh aspect, by making the n-type semiconductor coating formed on the alloy or the like in the coating process into a $MgTiO_3$ coating, the equilibrium dissociation pressure of the oxygen partial pressure in the boundary between the $MgTiO_3$ coating and the alloy or the like can be made extremely small ($10^{-26}$ atm or less at 1000° C.), and a Cr(VI) oxide suppressing state can be induced that can more satisfactorily suppress the formation of Cr(VI) oxides.

The SOFC cell according to the present invention for achieving the abovementioned objects is also a cell for a solid oxide fuel cell in which an air electrode and a Cr-containing alloy or oxide are joined together, wherein another aspect of the fuel cell is that a $MgTiO_3$ coating or other n-type semiconductor coating is formed on a surface of the alloy or oxide.

According to this aspect of the SOFC cell according to the present invention, the same structure is adopted as in the SOFC cell manufactured by the method for manufacturing an SOFC cell according to the abovementioned eleventh aspect, whereby the occurrence of Cr poisoning of the air electrode can be satisfactorily suppressed, both during the firing process and during operation, by the $MgTiO_3$ coating or other minimally oxidative n-type semiconductor coating formed on the surface of the alloy or the like.

A twelfth aspect of the method for manufacturing an SOFC cell according to the present invention is that a combination of a plurality of types of the n-type semiconductor coating is formed on the surface of the alloy or oxide in the coating process.

According to the abovementioned twelfth aspect, the re-type semiconductor coating formed on the alloy or the like in the coating process is a combination of a plurality of types of n-type semiconductor coatings selected from the abovementioned $TiO_2$ coating, $Y_2O_3$ coating, $WO_3$ coating, $SiO_2$ coating, $CaTiO_3$ coating, $BaTiO_3$ coating, $Sm_2O_3$ coating, and $MgTiO_3$ coating, for example; and a Cr(VI) oxide suppressing state can be induced that can more satisfactorily suppress the formation of Cr(VI) oxides.

The SOFC cell according to the present invention for achieving the abovementioned objects is also a cell for a solid oxide fuel cell in which an air electrode and a Cr-containing alloy or oxide are joined together, wherein another aspect of the fuel cell is that a combination of a plurality of types of n-type semiconductor coatings is formed on a surface of the alloy or oxide.

According to this aspect of the SOFC cell according to the present invention, the same structure is adopted as in the SOFC cell manufactured by the method for manufacturing an SOFC cell according to the abovementioned twelfth aspect, whereby the occurrence of Cr poisoning of the air electrode can be satisfactorily suppressed, both during the firing process and during operation, by the combination of a plurality of types of minimally oxidative n-type semiconductor coatings formed on the surface of the alloy or the like.

A thirteenth aspect of the method for manufacturing an SOFC cell according to the present invention is that the Cr(VI) oxide suppressing state is induced by setting oxidation parameters of an oxidizing agent partial pressure and a firing temperature in the firing process within ranges for suppressing formation of an oxide of Cr(VI) and allowing formation of an oxide of Cr(III).

According to the abovementioned thirteenth aspect, the maximum set values of the oxidation parameters, which include the oxidizing agent partial pressure and the firing temperature in the firing process during manufacturing of the SOFC cell, are limited to within relatively low ranges capable of suppressing formation of $CrO_3$, $CrO_2(OH)_2$, and other Cr(VI) oxides, whereby the firing process can be performed with the alloy or the like in the above-mentioned Cr(VI) oxide suppressing state, and the occurrence of Cr poisoning of the air electrode can be suppressed.

At the same time, a protective coating of $Cr_2O_3$ having an appropriate thickness can be formed on the surface of the alloy by the firing process, and this can be achieved by limiting the minimum set values of the oxidation parameters to within ranges capable of allowing formation of $Cr_2O_3$ and other Cr(III) oxides while setting the oxidation parameters in the firing process to within relatively low ranges capable of suppressing the formation of Cr(VI) oxides. The thermal resistance of the alloy can thereby be enhanced while the increase in contact resistance between the alloy and the air electrode due to the protective coating of $Cr_2O_3$ is reduced as much as possible.

A fourteenth aspect of the method for manufacturing an SOFC cell according to the present invention is that the oxidation parameters are set within ranges for preventing reduction of the air electrode.

According to the abovementioned fourteenth aspect, the oxidation parameters, which include the oxidizing agent partial pressure and the firing temperature in the firing process during manufacturing of the SOFC cell, are set within parameters for preventing reduction of the air electrode, which is the member most easily affected by a reducing atmosphere among the air electrode, the electrolyte, the fuel electrode, and other components that constitute the SOFC cell. It is thereby possible to satisfactorily prevent performance degradation during operation due to reduction of the constituent members of the SOFC cell, and, in particular, degradation in capability in which the oxygen is reduced to oxide ions or conductivity, naturally required by the air electrode.

Specifically, air electrodes are mainly used in which Sr or Ca is doped in the A-site of a base composed of $LaMnO_3$, $LaCoO_3$, $LaFeO_3$, or the like. Among these air electrodes, an $LaCoO_3$-based air electrode or an $LaFeO_3$-based air electrode is most easily reduced. At 1000° C., the air electrode is reduced to $La_2O_3$ and metallic Co or Fe at an oxygen partial pressure $P(O_2)$ of $10^{-7}$ atm or lower. An $LaMnO_3$-based air electrode is reduced in the same manner at an oxygen partial pressure $P(O_2)$ of $10^{-7}$ atm or lower at 1000° C.

When the air electrode is reduced during the firing process, there is a risk of degradation in capability in which the oxygen is reduced to oxide ions or conductivity, naturally required by the air electrode during operation. It is apparent that reduction of the air electrode during the firing process must be prevented as much as possible.

It is thus preferred that the oxidation parameters of the oxidizing agent partial pressure and the firing temperature in the firing process be set within ranges in which formation of Cr(III) oxides is allowed, and formation of Cr(VI) oxides is suppressed, and furthermore within ranges in which the air electrode is not reduced.

Referring to the oxygen partial pressure dependency of the vapor pressure of $CrO_3$, which is a typical compound of Cr(VI) and which is shown in FIG. 23, the vapor pressure $P(CrO_3)$ of $CrO_3$ when the oxygen partial pressure $P(O_2)$ is $10^{-2}$ atm can be suppressed to approximately 1/30 the $CrO_3$ vapor pressure when the oxygen partial pressure $P(O_2)$ is atmospheric pressure. The minimum set values of the oxidation parameters are more preferably limited to within ranges wherein the $LaCoO_3$ or other air electrode members are not reduced, while the oxidation parameters in the firing process are set within relatively low ranges wherein the formation of Cr(VI) oxides can be suppressed.

A fifteenth aspect of the method for manufacturing an SOFC cell according to the present invention is that an oxygen partial pressure and a water vapor partial pressure are set as the oxidizing agent partial pressure.

According to the abovementioned fifteenth aspect, when the alloy or the like is exposed to an extremely high temperature of about 1000° C. in the firing process, since water vapor also functions as an oxidizing agent for Cr in addition to oxygen, the water vapor partial pressure is preferably set in addition to the oxygen partial pressure as the oxidizing agent partial pressure, which is an oxidation parameter in the firing process.

For example, in a firing process in which the firing temperature is set to about 1000° C. to 1150° C. and in which the water vapor partial pressure is extremely small, according to the vapor pressure $P(CrO_3)$ of the oxide of Cr(VI) shown in FIG. 23, the oxygen partial pressure $P(O_2)$ whereby formation of Cr(III) oxides can be allowed is $10^{-23}$ atm or higher, whereas the oxygen partial pressure $P(O_2)$ whereby formation of Cr(VI) oxides can be suppressed is $10^{-2}$ atm or lower (i.e., a range in which the vapor pressure of Cr(VI) oxides is kept below about 1/30 atmospheric pressure). Therefore, the suitable range for setting the oxygen partial pressure $P(O_2)$ is $10^{-23}$ atm or higher and $10^{-2}$ atm or lower.

When the oxidation parameters are set within ranges for preventing reduction of the air electrode, as for the oxygen partial pressure $P(O_2)$ capable of preventing reduction of the air electrode, an oxygen partial pressure $P(O_2)$ of $10^{-7}$ atm or higher can prevent reduction of an $LaCoO_3$-based air electrode to $La_2O_3$, metallic Co, or the like at a firing temperature of 1000° C., and an oxygen partial pressure $P(O_2)$ of $10^{-17}$ atm or higher can prevent reduction of an $LaMnO_3$-based air electrode in the same manner.

A sixteenth aspect of the method for manufacturing an SOFC cell according to the present invention is that a binder ignition process is performed wherein, in a state in which a mixture of an organic binder and a powder of the air electrode is applied to the alloy or oxide, the alloy or oxide is heated in an oxidizing agent atmosphere at a heating temperature less than the firing temperature in the firing process, and the organic binder is fired; and the oxidizing agent partial pressure is then reduced and the firing process performed.

When the oxidizing agent partial pressure is low as described above, there is a tendency for the bond between the semiconductor ceramic adhesive and the alloy or the like to be adversely affected after the firing process. This is caused by carbonization due to incomplete combustion of the organic binder. Therefore, according to the above-mentioned sixteenth aspect, prior to the above described firing process, the abovementioned binder ignition process is performed for the mixture of the organic binder and air electrode powder applied to the alloy or the like, and the mixture is heated at a temperature equal to or higher than the ignition temperature of the organic binder in an oxidizing agent atmosphere, whereby the organic binder included in the mixture can be satisfactorily oxidized and combusted, and, as a result, inadequate joining of the air electrode to the alloy or the like due to residual organic binder components can be prevented.

Since the heating temperature in the above-mentioned binder ignition process is set to a lower temperature than the firing temperature in the abovementioned firing process, the formation of Cr(VI) oxides can be suppressed, and the occurrence of Cr poisoning of the air electrode can be suppressed.

BRIEF DESCRIPTION OF THE DRAWINGS

FIG. 3 is a diagram showing the Cr distribution after maintaining the operating temperature of the simulated SOFC cell of Example 1-1;

FIG. 4 is a diagram showing the Cr distribution after maintaining the operating temperature of the simulated SOFC cell of Comparative Example 1;

FIG. 5 is a diagram showing the Cr distribution after the firing process of the simulated SOFC cell of Example 1-2;

FIG. 6 is a diagram showing the Cr distribution after the firing process of the simulated SOFC cell of Example 1-3;

FIG. 10 is a diagram showing the Cr distribution after maintaining the operating temperature of the simulated SOFC cell of Example 4;

FIG. 11 is a diagram showing the Cr distribution after maintaining the operating temperature of the simulated SOFC cell of Example 5;

FIG. 12 is a diagram showing the Cr distribution after maintaining the operating temperature of the simulated SOFC cell of Example 6;

FIG. 13 is a diagram showing the Cr distribution after maintaining the operating temperature of the simulated SOFC cell of Example 7;

FIG. 15 is a diagram showing the Cr distribution (a) and the Al distribution (b) after the firing process of the simulated SOFC cell of Example 9;

FIG. 16 is a diagram showing the Cr distribution after the firing process of the simulated SOFC cell of Example 10;

FIG. 17 is a diagram showing the Cr distribution after maintaining the operating temperature of the simulated SOFC cell of Example 10;

FIG. 28 is a table showing the standard electrode potential characteristics of the oxides;

FIG. 29 is a diagram showing the Cr distributions after the firing process at oxygen partial pressures of $2.5 \times 10^{-2}$ atm (a), $5 \times 10^{-2}$ atm (b), $1 \times 10^{-1}$ atm (c), and $2 \times 10^{-1}$ atm (d) in the simulated SOFC cell of Comparative Example 5;

| [KEY] | |
|---|---|
| 1 | interconnect (alloy or oxide) |
| 1a | interface |
| 2a | airflow channel |
| 2 | trench |
| 2b | fuel flow channel |
| 3 | single cell |
| 30 | electrolyte film |
| 31 | air electrode |
| 32 | fuel electrode |
| C | SOFC cell (cell for a solid oxide fuel cell) |

BEST MODE FOR CARRYING OUT THE INVENTION

Embodiments of a SOFC cell and method for manufacturing thereof according to the present invention will be described with reference to the accompanying drawings.

Figure 1:
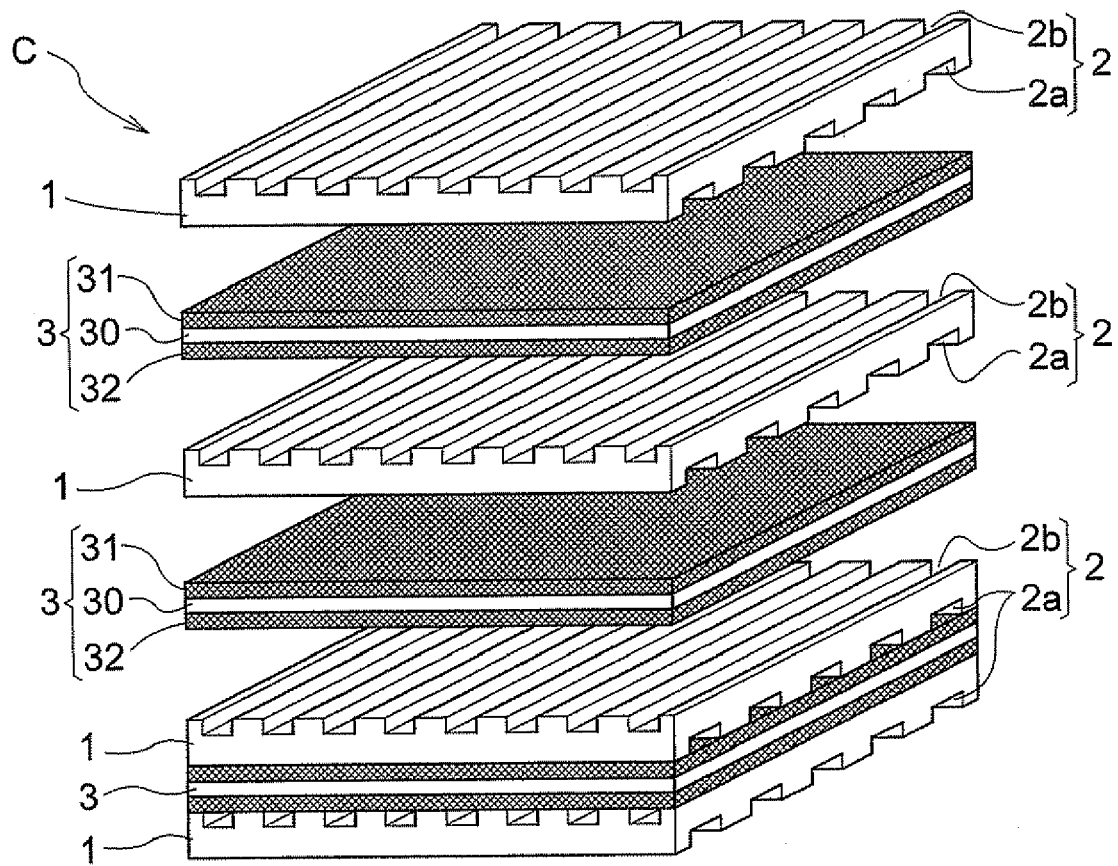
FIG. 1 is a schematic perspective view showing a disassembled state of the elements of the SOFC cell.
Figure 2:
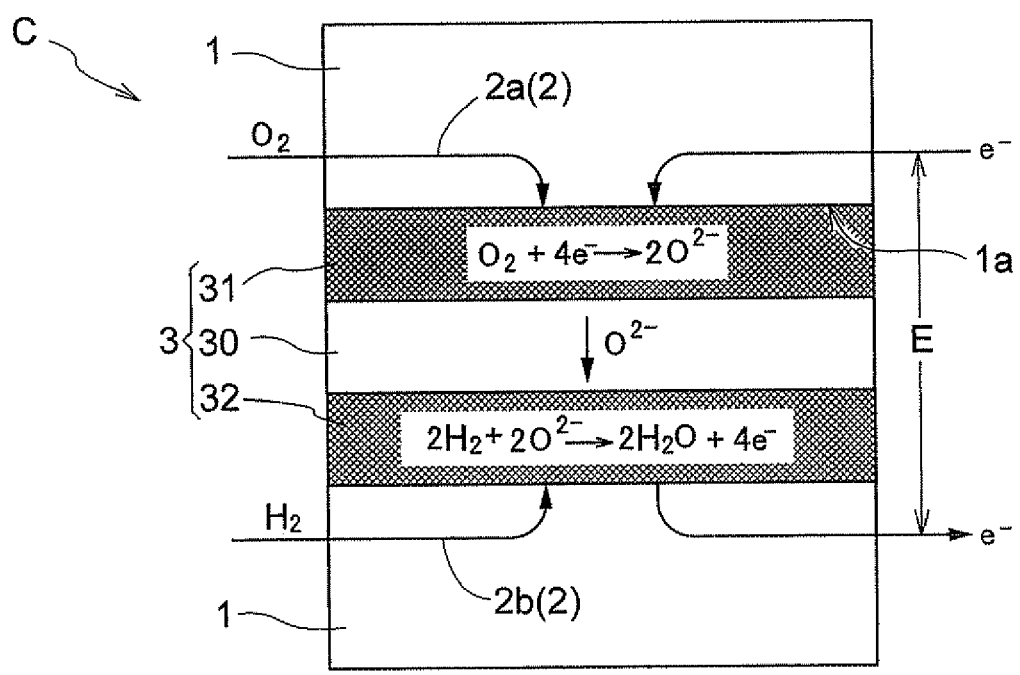
FIG. 2 is a diagram showing the operating principle of the SOFC cell.

The SOFC cell C shown in FIGS. 1 and 2 is provided with single cells 3 in which an air electrode 31 composed of an oxide-ion and electron-conductive porous body is joined to one side of an electrolyte film 30 composed of a dense of an oxide ion conductive solid oxide, and a fuel electrode 32 composed of an electron conductive porous body is joined to the other side of the same electrolyte film 30.

Furthermore, the SOFC cell C has a structure in which the single cells 3 are sandwiched in a state of being appropriately held by a gas seal on the external peripheral edge part by pairs of interconnects 1 composed of an electron conductive alloy or oxide, in which trenches 2 are formed for feeding air and hydrogen and exchanging electrons with respect to the air electrodes 31 or the fuel electrodes 32. The trenches 2 facing the air electrode 31 are arranged where the air electrodes 31 and the interconnects 1 are adhered to each other, and thereby function as airflow channels 2a for feeding air to the air electrodes 31; and the trenches 2 facing the fuel electrode 32 are arranged where the fuel electrodes 32 and the interconnects 1 are adhered to each other, and thereby function as fuel flow channels 2b for feeding hydrogen to the fuel electrodes 32.

Common materials that are used in the elements constituting the SOFC cell C will be described. For example, an (La, AE)MO$_3$ perovskite-type oxide in which a portion of the La in LaMO$_3$ (wherein M=Mn, Fe, Co, for example) is substituted with an alkaline earth metal AE (wherein AE=Sr, Ca) may be used as the material for forming the air electrode 31, a cermet of Ni and yttria-stabilized zirconia (YSZ) may be used as the material for forming the fuel electrode 32, and yttria-stabilized zirconia (YSZ) may be used as the material for forming the electrolyte film 30.

In the SOFC cell C described thus far, a Cr-containing alloy or oxide such as an LaCrO$_3$ or other perovskite-type oxide, a Fe—Cr alloy ferrite-based stainless steel, a Fe—Cr—Ni alloy austenite-based stainless steel, a Ni—Cr alloy nickel-based alloy, or the like having excellent electron conductivity and thermal resistance is used as the material for forming the interconnects 1.

A plurality of SOFC cells C in a stacked arrangement is pressed and held together in the stacking direction by a plurality of bolts and nuts, and a cell stack is formed.

In this cell stack, the interconnects 1 disposed on the ends in the stacking direction may have either the fuel flow channels 2b or the airflow channels 2a formed therein, and the other interconnects 1 used for the intermediate positions may have fuel flow channels 2b formed on one side thereof, and airflow channels 2a formed on the other side thereof. The abovementioned interconnects 1 are sometimes referred to as separators in a cell stack having this stacked structure.

An SOFC having such a cell stack structure is commonly referred to as a planar SOFC. A planar SOFC is described by way of example in the present embodiment, but the present invention may also be applied to a differently structured SOFC.

During operation of an SOFC provided with such a SOFC cell C, air is fed to the air electrode 31 via the airflow channels 2a formed in the adjacent interconnect 1, hydrogen is fed to the fuel electrode 32 via the fuel flow channels 2b formed in the adjacent interconnect 1, as shown in FIG. 2, and operation occurs at an operating temperature of about 800° C., for example. At this time, O$_2$ reacts with an electron e$^-$ in the air electrode 31 to form O$^{2-}$, the O$^{2-}$ moves to the fuel electrode 32 through the electrolyte film 30, and the H$_2$ fed in the fuel electrode 32 reacts with the O$^{2-}$ to form H$_2$O and e$^-$, whereby an electromotive force E is generated between the pair of interconnects 1, and the electromotive force E is brought out to the outside and used.

In the process for manufacturing the SOFC cell C, for such purposes as making the contact resistance between the interconnects 1 and the air electrode 31 and fuel electrode 32 as low as possible, a firing process is sometimes performed for firing these components at a firing temperature of about 1000° C., which is higher than the operating temperature, in a state in which the components are stacked together.

In the SOFC cell C formed by joining together the air electrode 31 and the interconnect 1 composed of a Cr-containing alloy or the like as described above, the alloy or the like is exposed to high temperatures during operation or the firing process, whereby the Cr contained in the interconnect 1 is oxidized and evaporates and scatters towards the air electrode 31, and the problem of Cr poisoning of the air electrode 31 occurs.

Such Cr poisoning occurs by a process in which Cr$_2$O$_3$ as an oxide of Cr (III) formed by oxidation of the Cr included in the interconnect 1 is oxidized by O$_2$ or H$_2$O present on the side of the air electrode 31 or another component, CrO$_3$ or CrO$_2$(OH)$_2$ are formed as Cr(VI) oxides in the vapor phase, and the Cr(VI) oxides move toward the air electrode 31, and are reduced to Cr$_2$O$_3$ in the electrode or near the interface with the electrolyte film 30 or deposited as Cr compounds by reaction with the air electrode 31. In the presence of water vapor, CrO$_2$(OH)$_2$ easily forms, and Cr(VI) easily scatters.

When Cr poisoning of the air electrode 31 occurs in this manner, the reduction reaction of oxygen is inhibited by the formation of O$^{2-}$ that takes place in the electrode or in the interface of the air electrode 31 and the electrolyte film 30 during operation, this Cr furthermore takes the place of the Sr, Ca, or the like doped into the air electrode 31, and $SrCr_2O_4$, $SrCrO_4$, $CaCr_2O_4$, $CaCrO_4$, and other high-resistance compounds are formed, and the electrical resistance of the air electrode 31 itself is increased by the disappearance of Sr or Ca, which can lead to reduced performance of the SOFC. The amount of Cr included in the alloy or the like is also reduced, and the thermal resistance of the alloy or the like as such can be reduced.

The method for manufacturing a SOFC cell C according to the present invention has characteristics whereby Cr poisoning of the air electrode 31 can be satisfactorily suppressed, and the details of this manufacturing method will be described hereinafter.

In the method for manufacturing an SOFC, a Cr(VI) oxide suppressing state is induced for suppressing the formation of an oxide of Cr(VI) in the Cr included in the interconnect 1, and the firing process is performed for firing the interconnect 1 and the air electrode 31, in a state of being joined together, at a firing temperature of about 1000° C. to 1150° C.

Since the Cr included in the interconnect 1 is thereby prevented from being oxidized to Cr(VI) having a valence of 6+ in the firing process, the formation of $CrO_3$ or $CrO_2(OH)_2$, which are Cr(VI) oxides in the vapor phase, is adequately suppressed, and the occurrence of Cr poisoning of the air electrode 31 due to movement of the Cr(VI) oxides to the air electrode 31 can be satisfactorily suppressed. Since the Cr content of the alloy or the like can also be prevented from decreasing, reduction of the thermal resistance of the alloy or the like as such can also be suppressed.

The first through fifth embodiments, described hereinafter are of methods for inducing the Cr(VI) oxide suppressing state for suppressing the formation of Cr(VI) oxides in the Cr included in the interconnect 1, and the details of each embodiment will be described hereinafter.

First Embodiment

In the first embodiment, the abovementioned Cr(VI) oxide suppressing state is induced by forming a $TiO_2$ coating (titanic coating) for functioning as a minimally oxidative n-type semiconductor coating on at least the surface of the interconnect 1 that includes the interface 1a (see FIG. 2) with the air electrode 31 prior to the firing process.

Specifically, in the SOFC cell C in which a $TiO_2$ coating is formed at the interface 1a of the interconnect 1, because the $TiO_2$ coating has a dense structure as well as excellent thermal resistance, oxygen or water vapor as the oxidizing agent is prevented from being fed to the interconnect 1 via the $TiO_2$ coating, and Cr(VI) oxides are also prevented from moving toward the air electrode 31 via the $TiO_2$ coating. As a result, Cr poisoning of the air electrode 31 during operation or the firing process at the time of manufacturing can be satisfactorily suppressed even when the interconnect 1 is exposed to high temperatures.

Example 1-1

A description is given below of the experimental results of observing the Cr distribution in a cross-section of the vicinity of the joint portion between the alloy and the air electrode in a simulated SOFC cell (Example 1-1) manufactured by a process in which a $TiO_2$ coating as an n-type semiconductor coating was formed by a dry-process film formation method on the surface of the alloy used in the interconnect or the like prior to the firing process, as in the first embodiment, and in a simulated SOFC cell (Comparative Example 1) manufactured without forming the $TiO_2$ coating or other n-type semiconductor coating on the alloy surface.

In both the simulated SOFC cells of Example 1-1 and Comparative Example 1, the alloy was an Fe—Cr-based alloy (Cr content: 22 wt %), and the air electrode was (La, Sr) (Co, Fe)$O_3$.

In the simulated SOFC cell of Example 1-1, a reactive direct-current magnetron sputtering method was used as the dry-process film formation method for forming the $TiO_2$ coating on the alloy surface, and the thickness of the $TiO_2$ coating was 0.8 μm.

In the present experiment, the simulated SOFC cells of Example 1-1 and Comparative Example 1 were fired for two hours at a firing temperature of 1000° C. to 1150° C. in an air atmosphere, and then left for 200 hours in a state of continuous direct-current application of 0.96 A/cm$^2$ at an operating temperature of 800° C. in an air atmosphere to simulate operational conditions. The surface resistance added to the alloy and the $TiO_2$ coating after 200 hours was 41 mΩ·cm$^2$. The Cr distribution in a cross-section near the joint portion of the alloy and the air electrode was then analyzed by an EPMA (Electron Probe Micro Analyzer) for each of the simulated SOFC cells.

FIG. 3 shows the Cr distribution results after maintaining the operating temperature of the simulated SOFC cell of Example 1-1; and FIG. 4 shows the Cr distribution results after maintaining the operating temperature of the simulated SOFC cell of Comparative Example 1. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 3, the Cr concentration was approximately 0% in substantially the entire air electrode, and almost no Cr poisoning was identified in the air electrode in the simulated SOFC cell of Example 1-1 in which the $TiO_2$ coating was formed on the alloy surface.

In the simulated SOFC cell of Comparative Example 1 in which the $TiO_2$ coating was not formed, the Cr concentration was high, being approximately 10% to 14% in the region (the dark gray region in the air electrode shown in FIG. 4) of the air electrode near the alloy, as shown in FIG. 4, and about 2% to 10% even in the region somewhat more distant from the alloy, and extremely advanced Cr poisoning of the air electrode was confirmed. The surface resistance of the alloy after 200 hours was 14 mΩ·cm$^2$.

Example 1-2

A description is given below of the experimental results of observing the Cr distribution in a cross-section of the vicinity of the joint portion between the alloy and the air electrode in a simulated SOFC cell (Example 1-2) manufactured by a process in which a $TiO_2$ coating as an n-type semiconductor coating was formed by a dry-process film formation method on the surface of the alloy used in the interconnect or the like prior to the firing process, as in the first embodiment, and in a simulated SOFC cell (Comparative Example 2) manufactured without forming the $TiO_2$ coating or other n-type semiconductor coating on the alloy surface.

In both the simulated SOFC cells of Example 1-2 and Comparative Example 2, the alloy was an Fe—Cr-based alloy (Cr content: 22 wt %), and the air electrode was (La, Sr)(Co, Fe)$O_3$.

In the simulated SOFC cell of Example 1-2, an open air CVD method was used as the dry-process film formation method for forming the $TiO_2$ coating on the alloy surface, and the thickness of the $TiO_2$ coating was 0.8 μm.

In the present experiment, the simulated SOFC cells of Example 1-2 and Comparative Example 2 were fired for two hours at a firing temperature of 1000° C. to 1150° C. in an air atmosphere. The Cr distribution in a cross-section near the joint portion of the alloy and the air electrode was then analyzed by an EPMA (Electron Probe Micro Analyzer) for each of the simulated SOFC cells.

Figure 22:
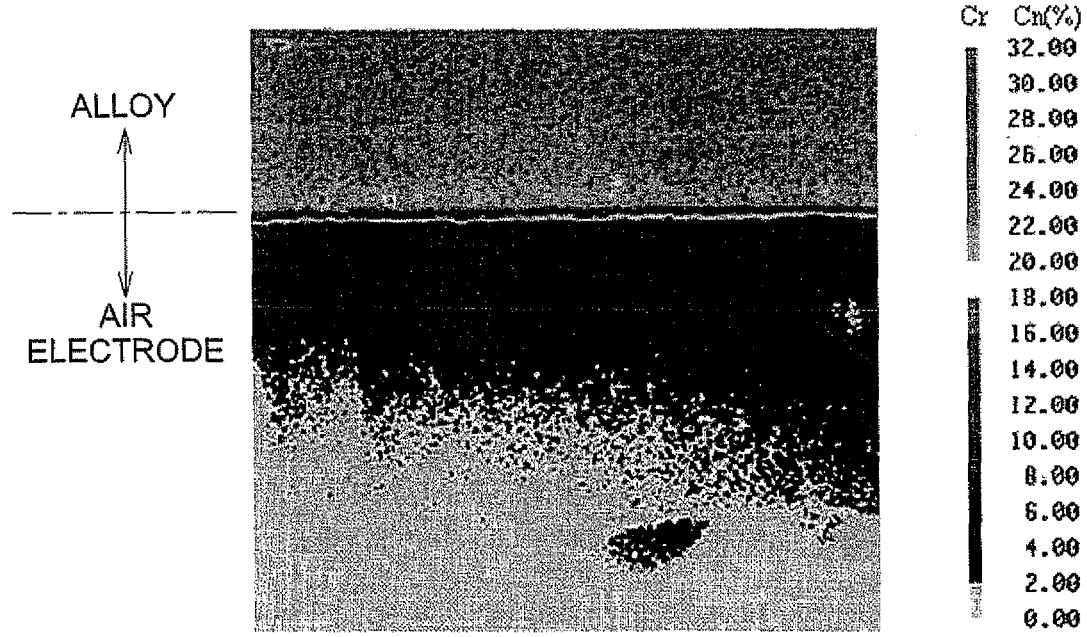
FIG. 22 is a diagram showing the Cr distribution after the firing process of the simulated SOFC cell of Comparative Example 2.

FIG. 5 shows the results of analyzing the Cr distribution after the firing process of the simulated SOFC cell of Example 1-2; and FIG. 22 shows the results of analyzing the Cr distribution after the firing process of the simulated SOFC cell of Comparative Example 2. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 5, the Cr concentration was approximately 0% in substantially the entire air electrode, and almost no Cr poisoning was identified in the air electrode in the simulated SOFC cell of Example 1-2 in which the $TiO_2$ coating was formed on the alloy surface.

In the simulated SOFC cell of Comparative Example 2 in which the $TiO_2$ coating was not formed, the Cr concentration was high, being approximately 10% to 14% in the region (the dark gray region in the air electrode shown in FIG. 22) of the air electrode near the alloy, as shown in FIG. 22, and about 2% to 10% even in the region somewhat more distant from the alloy, and extremely advanced Cr poisoning of the air electrode was confirmed.

Example 1-3

A description is given below of the experimental results of observing the Cr distribution in a cross-section of the vicinity of the joint portion between the alloy and the air electrode in a simulated SOFC cell (Example 1-3) manufactured by a process in which a $TiO_2$ coating as an n-type semiconductor coating was formed by a wet-process film formation method on the surface of the alloy used in the interconnect or the like prior to the firing process, as in the first embodiment, and in a simulated SOFC cell (Comparative Example 2) manufactured without forming the $TiO_2$ coating or other n-type semiconductor coating on the alloy surface.

In both the simulated SOFC cells of Example 1-3 and Comparative Example 2, the alloy was an Fe—Cr-based alloy (Cr content: 22 wt %), and the air electrode was (La, Sr)(Co, Fe)$O_3$.

In the simulated SOFC cell of Example 1-3, a sol-gel method was used as the wet-process film formation method for forming the $TiO_2$ coating on the alloy surface, and the thickness of the $TiO_2$ coating was 2 to 3 μm.

In the present experiment, the simulated SOFC cells of Example 1-3 and Comparative Example 2 were fired for two hours at a firing temperature of 1000° C. to 1150° C. in an air atmosphere. The Cr distribution in a cross-section near the joint portion of the alloy and the air electrode was then analyzed by an EPMA (Electron Probe Micro Analyzer) for each of the simulated SOFC cells.

FIG. 6 shows the results of analyzing the Cr distribution after the firing process of the simulated SOFC cell of Example 1-3; and FIG. 22 shows the results of analyzing the Cr distribution after the firing process of the simulated SOFC cell of Comparative Example 2. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 6, the Cr concentration was approximately 0% in substantially the entire air electrode, and almost no Cr poisoning was identified in the air electrode in the simulated SOFC cell of Example 1-3 in which the $TiO_2$ coating was formed on the alloy surface.

In the simulated SOFC cell of Comparative Example 2 in which the $TiO_2$ coating was not formed, the Cr concentration was high, being approximately 10% to 14% in the region (the dark gray region in the air electrode shown in FIG. 22) of the air electrode near the alloy, as shown in FIG. 22, and about 2% to 10% even in the region somewhat more distant from the alloy, and extremely advanced Cr poisoning of the air electrode was confirmed.

A description is given below of the experimental results of observing the Cr distribution in a cross-section of the vicinity of the joint portion between the alloy and the air electrode in a simulated SOFC cell (Example 1-4) manufactured by a process in which a $TiO_2$ coating as an n-type semiconductor coating was formed by a dip coating method on the surface of the alloy used in the interconnect or the like prior to the firing process, as in the first embodiment.

In the simulated SOFC cell of Example 1-4, the alloy was an Fe—Cr-based alloy (Cr content: 22 wt %), and the air electrode was (La, Sr) (Co, Fe)$O_3$.

In the abovementioned dip coating method, the $TiO_2$ coating was formed by a process in which the alloy dipped in a liquid mixture of $TiO_2$ powder, alcohol, and an organic binder was lifted up, a coating of the liquid mixture was formed on the surface of the alloy, and the coating was dried in air at 150° C., and then heated for one hour at a heating temperature of 1000° C. The thickness of the $TiO_2$ coating thus formed was about 5 to 10 μm.

In the present experiment, the simulated SOFC cell of Example 1-4 was fired for two hours at a firing temperature of 1000° C. to 1150° C. in an air atmosphere, and then left for 200 hours in a state of continuous direct-current application of 0.96 A/$cm^2$ at an operating temperature of 800° C. in an air atmosphere to simulate operational conditions. The surface resistance added to the alloy and the $TiO_2$ coating after 200 hours was 70 mΩ·$cm^2$. The Cr distribution in a cross-section near the joint portion of the alloy and the air electrode was then analyzed by an EPMA (Electron. Probe Micro Analyzer) for the simulated SOFC cell.

Figure 7:
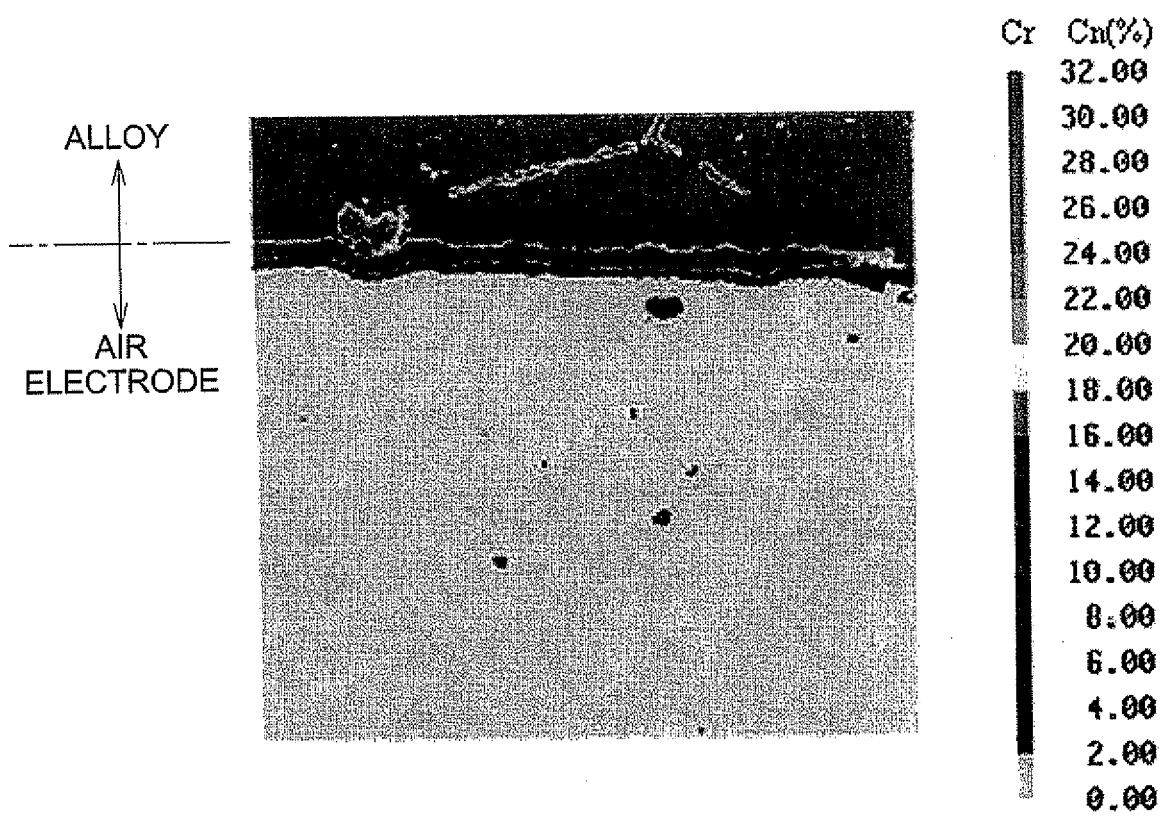
FIG. 7 is a diagram showing the Cr distribution after the firing process of the simulated SOFC cell of Example 1-4.

FIG. 7 shows the results of analyzing the Cr distribution after the firing process of the simulated SOFC cell of Example 1-4. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 7, the Cr concentration was approximately 0% in substantially the entire air electrode, and almost no Cr poisoning was identified in the air electrode in the simulated SOFC cell of Example 1-4 in which the $TiO_2$ coating was formed on the alloy surface.

Second Embodiment

In the second embodiment, the abovementioned Cr(VI) oxide suppressing state is induced by forming a $Y_2O_3$ coating (yttria coating) for functioning as a minimally oxidative n-type semiconductor coating on at least the surface of the interconnect 1 that includes the interface 1a (see FIG. 2) with the air electrode 31 prior to the firing process.

Specifically, in the SOFC cell C in which a $Y_2O_3$ coating is formed at the interface 1a of the interconnect 1, because the $Y_2O_3$ coating has a dense structure as well as excellent thermal resistance, oxygen or water vapor as the oxidizing agent is prevented from being fed to the interconnect 1 via the $Y_2O_3$ coating, and Cr(VI) oxides are also prevented from moving toward the air electrode 31 via the $Y_2O_3$ coating. As a result, Cr poisoning of the air electrode 31 during operation or the firing process at the time of manufacturing can be satisfactorily suppressed even when the interconnect 1 is exposed to high temperatures.

Example 2

A description is given below of the experimental results of observing the Cr distribution in a cross-section of the vicinity of the joint portion between the alloy and the air electrode in a simulated SOFC cell (Example 2) manufactured by a process in which a $Y_2O_3$ coating as an re-type semiconductor coating was formed by a dry-process film formation method on the surface of the alloy used in the interconnect or the like prior to the firing process, as in the second embodiment, and in a simulated SOFC cell (Comparative Example 2) manufactured without forming the $Y_2O_3$ coating or other n-type semiconductor coating on the alloy surface.

In both the simulated SOFC cells of Example 2 and Comparative Example 2, the alloy was an Fe—Cr-based alloy (Cr content: 22 wt %), and the air electrode was (La, Sr)(Co, Fe)$O_3$.

In the simulated SOFC cell of Example 2, a high-frequency magnetron sputtering method was used as the dry-process film formation method for forming the $Y_2O_3$ coating on the alloy surface, and the thickness of the $Y_2O_3$ coating was 0.8 μm.

In the present experiment, the simulated SOFC cells of Example 2 and Comparative Example 2 were fired for two hours at a firing temperature of 1000° C. to 1150° C. in an air atmosphere. The Cr distribution in a cross-section near the joint portion of the alloy and the air electrode was then analyzed by an EPMA (Electron Probe Micro Analyzer) for each of the simulated SOFC cells.

Figure 8:
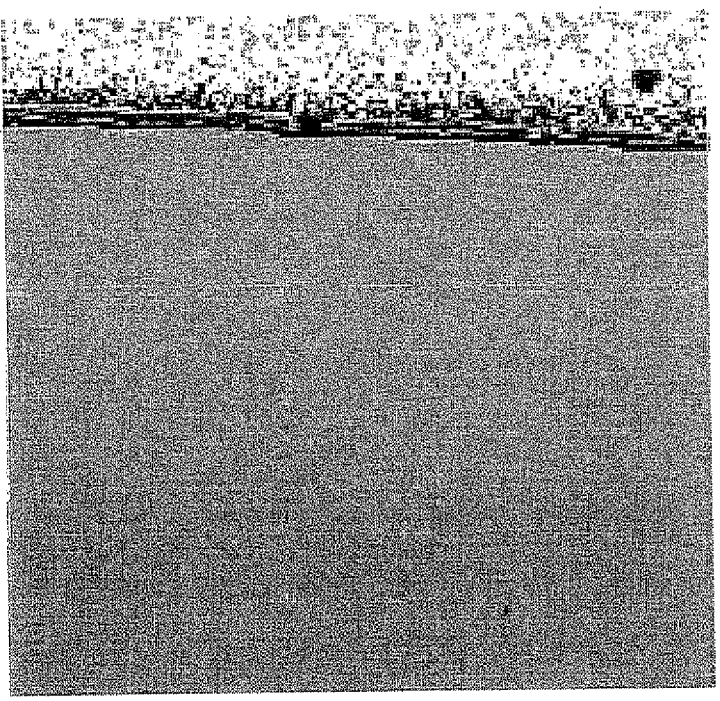
FIG. 8 is a diagram showing the Cr distribution after the firing process of the simulated SOFC cell of Example 2.

FIG. 8 shows the results of analyzing the Cr distribution after the firing process of the simulated SOFC cell of Example 2; and FIG. 22 shows the results of analyzing the Cr distribution after the firing process of the simulated SOFC cell of Comparative Example 2. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 8, the Cr concentration was approximately 0% in substantially the entire air electrode, and almost no Cr poisoning was identified in the air electrode in the simulated SOFC cell of Example 2 in which the $Y_2O_3$ coating was formed on the alloy surface.

In the simulated SOFC cell of Comparative Example 2 in which the $Y_2O_3$ coating was not formed, the Cr concentration was high, being approximately 10% to 14% in the region (the dark gray region in the air electrode shown in FIG. 22) of the air electrode near the alloy, as shown in FIG. 22, and about 2% to 10% even in the region somewhat more distant from the alloy, and extremely advanced Cr poisoning of the air electrode was confirmed.

After the firing process was performed, the simulated SOFC cells of Example 2 and Comparative Example 2 were subjected to conduction testing in which a continuous direct-current flow of 0.96 A/cm² at 800° C. was maintained for 200 hours to simulate operational conditions. As a result, in the simulated SOFC cell of Example 2 in which the $Y_2O_3$ coating was formed on the alloy surface, the surface resistance added to the alloy and the $Y_2O_3$ after 66 hours was 78 mΩ·cm².

Third Embodiment

In the third embodiment, the abovementioned Cr(VI) oxide suppressing state is induced by forming a $WO_3$ coating (tungsten oxide coating) for functioning as a minimally oxidative n-type semiconductor coating on at least the surface of the interconnect 1 that includes the interface 1a (see FIG. 2) with the air electrode 31 prior to the firing process.

Specifically, in the SOFC cell C in which a $WO_3$ coating is formed at the interface 1a of the interconnect 1, because the $WO_3$ coating has a dense structure as well as excellent thermal resistance, oxygen or water vapor as the oxidizing agent is prevented from being fed to the interconnect 1 via the $WO_3$ coating, and Cr(VI) oxides are also prevented from moving toward the air electrode 31 via the $WO_3$ coating. As a result, Cr poisoning of the air electrode 31 during operation or the firing process at the time of manufacturing can be satisfactorily suppressed even when the interconnect 1 is exposed to high temperatures.

Example 3

A description is given below of the experimental results of observing the Cr distribution in a cross-section of the vicinity of the joint portion between the alloy and the air electrode in a simulated SOFC cell (Example 3) manufactured by a process in which a $WO_3$ coating as an n-type semiconductor coating was formed by a dry-process film formation method on the surface of the alloy used in the interconnect or the like prior to the firing process, as in the third embodiment, and in a simulated SOFC cell (Comparative Example 2) manufactured without forming the $WO_3$ coating or other n-type semiconductor coating on the alloy surface.

In both the simulated SOFC cells of Example 3 and Comparative Example 2, the alloy was an Fe—Cr-based alloy (Cr content: 22 wt %), and the air electrode was (La, Sr) (Co, Fe)$O_3$.

In the simulated SOFC cell of Example 3, a reactive direct-current magnetron sputtering method was used as the dry-process film formation method for forming the $WO_3$ coating on the alloy surface, and the thickness of the $WO_3$ coating was 0.8 μm.

In the present experiment, the simulated SOFC cells of Example 3 and Comparative Example 2 were fired for two hours at a firing temperature of 1000° C. to 1150° C. in an air atmosphere. The Cr distribution in a cross-section near the joint portion of the alloy and the air electrode was then analyzed by an EPMA (Electron Probe Micro Analyzer) for each of the simulated SOFC cells.

Figure 9:
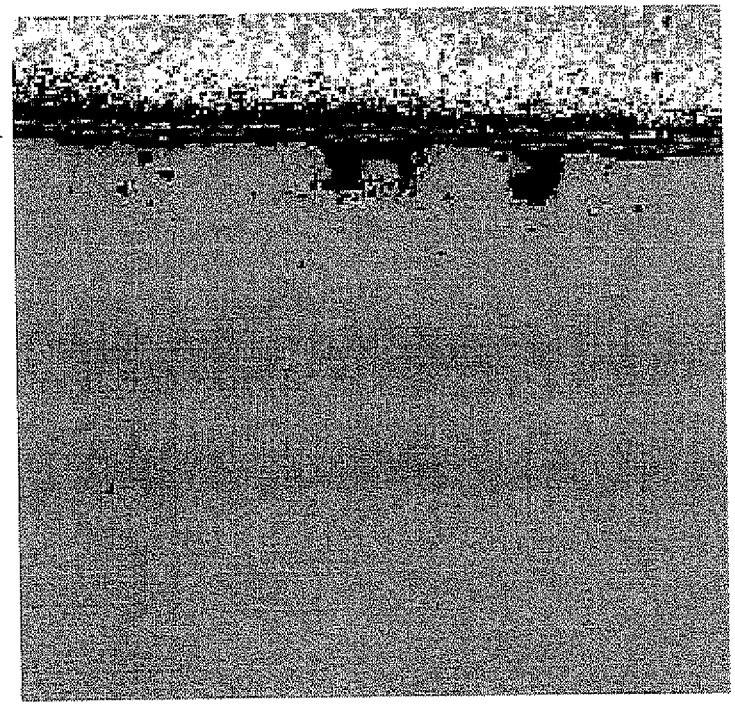
FIG. 9 is a diagram showing the Cr distribution after the firing process of the simulated SOFC cell of Example 3.

FIG. 9 shows the results of analyzing the Cr distribution after the firing process of the simulated SOFC cell of Example 3; and FIG. 22 shows the results of analyzing the Cr distribution after the firing process of the simulated SOFC cell of Comparative Example 2. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 9, although there was a slight amount of Cr scattering, the Cr concentration was approximately 0% in substantially the entire air electrode, and a significant amount of Cr poisoning was not identified in the air electrode in the simulated SOFC cell of Example 3 in which the $WO_3$ coating was formed on the alloy surface.

In the simulated SOFC cell of Comparative Example 2 in which the $WO_3$ coating was not formed, the Cr concentration was high, being approximately 10% to 14% in the region (the dark gray region in the air electrode shown in FIG. 22) of the air electrode near the alloy, as shown in FIG. 22, and about 2% to 10% even in the region somewhat more distant from the alloy, and extremely advanced Cr poisoning of the air electrode was confirmed.

Fourth Embodiment

In the fourth embodiment, the abovementioned Cr(VI) oxide suppressing state is induced by forming a $SiO_2$ coating for functioning as a minimally oxidative n-type semiconductor coating on at least the surface of the interconnect 1 that includes the interface 1a (see FIG. 2) with the air electrode 31 prior to the firing process.

Specifically, in the SOFC cell C in which a $SiO_2$ coating is formed at the interface 1a of the interconnect 1, because the $SiO_2$ coating has a dense structure as well as excellent thermal resistance, oxygen or water vapor as the oxidizing agent is prevented from being fed to the interconnect 1 via the $SiO_2$ coating, and Cr(VI) oxides are also prevented from moving toward the air electrode 31 via the $SiO_2$ coating. As a result, Cr poisoning of the air electrode 31 during operation or the firing process at the time of manufacturing can be satisfactorily suppressed even when the interconnect 1 is exposed to high temperatures.

Example 4

A description is given below of the experimental results of observing the Cr distribution in a cross-section of the vicinity of the joint portion between the alloy and the air electrode in a simulated SOFC cell (Example 4) manufactured by a process in which a $SiO_2$ coating as an re-type semiconductor coating was formed by a dry-process film formation method on the surface of the alloy used in the interconnect or the like prior to the firing process, as in the fourth embodiment, and in a simulated SOFC cell (Comparative Example 1) manufactured without forming the $SiO_2$ coating or other n-type semiconductor coating on the alloy surface.

In both the simulated SOFC cells of Example 4 and Comparative Example 1, the alloy was an Fe—Cr-based alloy (Cr content: 22 wt %), and the air electrode was (La, Sr)(Co, Fe)$O_3$.

In the simulated SOFC cell of Example 4, a sputtering method was used as the dry-process film formation method for forming the $SiO_2$ coating on the alloy surface, and the thickness of the $SiO_2$ coating was 0.8 μm.

In the present experiment, the simulated SOFC cells of Example 4 and Comparative Example 1 were fired for two hours at a firing temperature of 1000° C. to 1150° C. in an air atmosphere, and then left for 200 hours in a state of continuous direct-current application of 0.96 A/cm$^2$ at an operating temperature of 800° C. in an air atmosphere to simulate operational conditions. The surface resistance added to the alloy and the $SiO_2$ coating after 200 hours was 27 mΩ·cm$^2$. The Cr distribution in a cross-section near the joint portion of the alloy and the air electrode was then analyzed by an EPMA (Electron Probe Micro Analyzer) for each of the simulated SOFC cells.

FIG. 10 shows the Cr distribution results after maintaining the operating temperature of the simulated SOFC cell of Example 4; and FIG. 4 shows the Cr distribution results after maintaining the operating temperature of the simulated SOFC cell of Comparative Example 1. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 10, the Cr concentration was approximately 0% in substantially the entire air electrode, and almost no Cr poisoning was identified in the air electrode in the simulated SOFC cell of Example 4 in which the $SiO_2$ coating was formed on the alloy surface.

In the simulated SOFC cell of Comparative Example 1 in which the $SiO_2$ coating was not formed, the Cr concentration was high, being approximately 10% to 14% in the region (the dark gray region in the air electrode shown in FIG. 4) of the air electrode near the alloy, as shown in FIG. 4, and about 2% to 10% even in the region somewhat more distant from the alloy, and extremely advanced Cr poisoning of the air electrode was confirmed. The surface resistance of the alloy after 200 hours was 14 mΩ·cm$^2$.

Fifth Embodiment

In the fifth embodiment, the abovementioned Cr(VI) oxide suppressing state is induced by forming a $CaTiO_3$ coating (calcium titanate) for functioning as a minimally oxidative n-type semiconductor coating on at least the surface of the interconnect 1 that includes the interface 1a (see FIG. 2) with the air electrode 31 prior to the firing process.

Specifically, in the SOFC cell C in which a $CaTiO_3$ coating is formed at the interface 1a of the interconnect 1, because the $CaTiO_3$ coating has a dense structure as well as excellent thermal resistance, oxygen or water vapor as the oxidizing agent is prevented from being fed to the interconnect 1 via the $CaTiO_3$ coating, and Cr(VI) oxides are also prevented from moving toward the air electrode 31 via the $CaTiO_3$ coating. As a result, Cr poisoning of the air electrode 31 during operation or the firing process at the time of manufacturing can be satisfactorily suppressed even when the interconnect 1 is exposed to high temperatures.

Example 5

A description is given below of the experimental results of observing the Cr distribution in a cross-section of the vicinity of the joint portion between the alloy and the air electrode in a simulated SOFC cell (Example 5) manufactured by a process in which a CaTiO$_3$ coating as an n-type semiconductor coating was formed by a dry-process film formation method on the surface of the alloy used in the interconnect or the like prior to the firing process, as in the fifth embodiment, and in a simulated SOFC cell (Comparative Example 1) manufactured without forming the CaTiO$_3$ coating or other n-type semiconductor coating on the alloy surface.

In both the simulated SOFC cells of Example 5 and Comparative Example 1, the alloy was an Fe—Cr-based alloy (Cr content: 22 wt %), and the air electrode was (La, Sr)(Co, Fe)O$_3$.

In the simulated SOFC cell of Example 5, a high-frequency magnetron sputtering method was used as the dry-process film formation method for forming the CaTiO$_3$ coating on the alloy surface, and the thickness of the CaTiO$_3$ coating was 0.8 μm.

In the present experiment, the simulated SOFC cells of Example 5 and Comparative Example 1 were fired for two hours at a firing temperature of 1000° C. to 1150° C. in an air atmosphere, and then left for 200 hours in a state of continuous direct-current application of 0.96 A/cm$^2$ at an operating temperature of 800° C. in an air atmosphere to simulate operational conditions. The surface resistance added to the alloy and the CaTiO$_3$ coating after 200 hours was 100 mΩ·cm$^2$. The Cr distribution in a cross-section near the joint portion of the alloy and the air electrode was then analyzed by an EPMA (Electron Probe Micro Analyzer) for each of the simulated SOFC cells.

FIG. 11 shows the Cr distribution results after maintaining the operating temperature of the simulated SOFC cell of Example 5; and FIG. 4 shows the Cr distribution results after maintaining the operating temperature of the simulated SOFC cell of Comparative Example 1. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 11, although minimal in comparison to Comparative Example 1, scattering of Cr was identified in the air electrode in the simulated SOFC cell of Example 5 in which the CaTiO$_3$ coating was formed on the alloy surface. The reason for this is thought to be that the Ca(II) (Ca having a valence of 2+) in the coating reacts extremely easily with Cr(VI). Oxides of alkali metals and alkaline earth metals generally react easily with Cr(VI) oxides.

In the simulated SOFC cell of Comparative Example 1 in which the CaTiO$_3$ coating was not formed, the Cr concentration was high, being approximately 10% to 14% in the region (the dark gray region in the air electrode shown in FIG. 4) of the air electrode near the alloy, as shown in FIG. 4, and about 2% to 10% even in the region somewhat more distant from the alloy, and extremely advanced Cr poisoning of the air electrode was confirmed. The surface resistance of the alloy after 200 hours was 14 in cm$^2$.

Sixth Embodiment

In the sixth embodiment, the abovementioned Cr(VI) oxide suppressing state is induced by forming a BaTiO$_3$ coating (barium titanate) for functioning as a minimally oxidative n-type semiconductor coating on at least the surface of the interconnect 1 that includes the interface 1a (see FIG. 2) with the air electrode 31 prior to the firing process.

Specifically, in the SOFC cell C in which a BaTiO$_3$ coating is formed at the interface 1a of the interconnect 1, because the BaTiO$_3$ coating has a dense structure as well as excellent thermal resistance, oxygen or water vapor as the oxidizing agent is prevented from being fed to the interconnect 1 via the BaTiO$_3$ coating, and Cr(VI) oxides are also prevented from moving toward the air electrode 31 via the BaTiO$_3$ coating. As a result, Cr poisoning of the air electrode 31 during operation or the firing process at the time of manufacturing can be satisfactorily suppressed even when the interconnect 1 is exposed to high temperatures.

Example 6

A description is given below of the experimental results of observing the Cr distribution in a cross-section of the vicinity of the joint portion between the alloy and the air electrode in a simulated SOFC cell (Example 6) manufactured by a process in which a BaTiO$_3$ coating as an n-type semiconductor coating was formed by a dry-process film formation method on the surface of the alloy used in the interconnect or the like prior to the firing process, as in the sixth embodiment, and in a simulated SOFC cell (Comparative Example 1) manufactured without forming the BaTiO$_3$ coating or other n-type semiconductor coating on the alloy surface.

In both the simulated SOFC cells of Example 6 and Comparative Example 1, the alloy was an Fe—Cr-based alloy (Cr content: 22 wt %), and the air electrode was (La, Sr)(Co, Fe)O$_3$.

In the simulated SOFC cell of Example 6, a high-frequency magnetron sputtering method was used as the dry-process film formation method for forming the BaTiO$_3$ coating on the alloy surface, and the thickness of the BaTiO$_3$ coating was 0.8 μm.

In the present experiment, the simulated SOFC cells of Example 6 and Comparative Example 1 were fired for two hours at a firing temperature of 1000° C. to 1150° C. in an air atmosphere, and then left for 200 hours in a state of continuous direct-current application of 0.96 A/cm$^2$ at an operating temperature of 750° C. in an air atmosphere to simulate operational conditions. The surface resistance added to the alloy and the BaTiO$_3$ coating after 200 hours was 50 mΩ·cm$^2$. The Cr distribution in a cross-section near the joint portion of the alloy and the air electrode was then analyzed by an EPMA (Electron Probe Micro Analyzer) for each of the simulated SOFC cells.

FIG. 12 shows the Cr distribution results after maintaining the operating temperature of the simulated SOFC cell of Example 6; and FIG. 4 shows the Cr distribution results after maintaining the operating temperature of the simulated SOFC cell of Comparative Example 1. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results, as shown in FIG. 12, some scattering of Cr was identified in the simulated SOFC cell of Example 6 in which a BaTiO3 coating was formed on the alloy surface, the Cr concentration in substantially the entire air electrode was approximately 0%, and a significant amount of Cr poisoning of the air electrode was not identified.

On the other hand, in the simulated SOFC cell of Comparative Example 1 in which the BaTiO$_3$ coating was not formed on the alloy, the Cr concentration was high, being approximately 10% to 14% in the region (the dark gray region in the air electrode shown in FIG. 4) of the air electrode near the alloy, as shown in FIG. 4, and about 2% to 10% even in the region somewhat more distant from the alloy, and extremely advanced Cr poisoning of the air electrode was confirmed. The surface resistance of the alloy after 200 hours was 14 mΩ·cm$^2$.

Seventh Embodiment

In the seventh embodiment, the abovementioned Cr(VI) oxide suppressing state is induced by forming a Sm$_2$O$_3$ coating (samarium oxide coating) for functioning as a minimally oxidative n-type semiconductor coating on at least the surface of the interconnect 1 that includes the interface 1a (see FIG. 2) with the air electrode 31 prior to the firing process.

Specifically, in the SOFC cell C in which a Sm$_2$O$_3$ coating is formed at the interface 1a of the interconnect 1, because the Sm$_2$O$_3$ coating has a dense structure as well as excellent thermal resistance, oxygen or water vapor as the oxidizing agent is prevented from being fed to the interconnect 1 via the Sm$_2$O$_3$ coating, and Cr(VI) oxides are also prevented from moving toward the air electrode 31 via the Sm$_2$O$_3$ coating. As a result, Cr poisoning of the air electrode 31 during operation or the firing process at the time of manufacturing can be satisfactorily suppressed even when the interconnect 1 is exposed to high temperatures.

Example 7

A description is given below of the experimental results of observing the Cr distribution in a cross-section of the vicinity of the joint portion between the alloy and the air electrode in a simulated SOFC cell (Example 7) manufactured by a process in which a Sm$_2$O$_3$ coating as an n-type semiconductor coating was formed by a dry-process film formation method on the surface of the alloy used in the interconnect or the like prior to the firing process, as in the seventh embodiment.

In the simulated SOFC cell of Example 7, the alloy was an Fe—Cr-based alloy (Cr content: 22 wt %), and the air electrode was (La, Sr) (Co, Fe)O$_3$.

In the simulated SOFC cell of Example 7, a high-frequency magnetron sputtering method was used as the dry-process film formation method for forming the Sm$_2$O$_3$ coating on the alloy surface, and the thickness of the Sm$_2$O$_3$ coating was 0.8 μm.

In the present experiment, the simulated SOFC cell of Example 7 was fired for two hours at a firing temperature of 1000° C. to 1150° C. in an air atmosphere, and then left for 200 hours in a state of continuous direct-current application of 0.96 A/cm$^2$ at an operating temperature of 750° C. in an air atmosphere to simulate operational conditions. The surface resistance added to the alloy and the Sm$_2$O$_3$ coating after 200 hours was 36 mΩ·cm$^2$. The Cr distribution in a cross-section near the joint portion of the alloy and the air electrode was then analyzed by an EPMA (Electron Probe Micro Analyzer) for each of the simulated SOFC cells.

FIG. 13 shows the Cr distribution results after maintaining the operating temperature of the simulated SOFC cell of Example 7. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 13, although some scattering of Cr was identified in the simulated SOFC cell of Example 7 in which a Sm$_2$O$_3$ coating was formed on the alloy surface, the Cr concentration in substantially the entire air electrode was approximately 0%, and a significant amount of Cr poisoning of the air electrode was not identified.

Eighth Embodiment

In the eighth embodiment, the abovementioned Cr(VI) oxide suppressing state is induced by forming a MgTiO$_3$ coating (magnesium titanate coating) for functioning as a minimally oxidative n-type semiconductor coating on at least the surface of the interconnect 1 that includes the interface 1a (see FIG. 2) with the air electrode 31 prior to the firing process.

Specifically, in the SOFC cell C in which a MgTiO$_3$ coating is formed at the interface 1a of the interconnect 1, because the MgTiO$_3$ coating has a dense structure as well as excellent thermal resistance, oxygen or water vapor as the oxidizing agent is prevented from being fed to the interconnect 1 via the MgTiO$_3$ coating, and Cr(VI) oxides are also prevented from moving toward the air electrode 31 via the MgTiO$_3$ coating. As a result, Cr poisoning of the air electrode 31 during operation or the firing process at the time of manufacturing can be satisfactorily suppressed even when the interconnect 1 is exposed to high temperatures.

Example 8

A description is given below of the experimental results of observing the Cr distribution in a cross-section of the vicinity of the joint portion between the alloy and the air electrode in a simulated SOFC cell (Example 8) manufactured by a process in which a MgTiO$_3$ coating as an re-type semiconductor coating was formed by a dry-process film formation method on the surface of the alloy used in the interconnect or the like prior to the firing process, as in the eighth embodiment.

In the simulated SOFC cell of Example 8, the alloy was an Fe—Cr-based alloy (Cr content: 22 wt %), and the air electrode was (La, Sr) (Ca, Fe)O$_3$.

In the simulated SOFC cell of Example 8, a high-frequency magnetron sputtering method was used as the dry-process film formation method for forming the MgTiO$_3$ coating on the alloy surface, and the thickness of the MgTiO$_3$ coating was 0.8 μm.

In the present experiment, the simulated SOFC cell of Example 8 was fired for two hours at a firing temperature of 1000° C. to 1150° C. in an air atmosphere. The Cr distribution in a cross-section near the joint portion of the alloy and the air electrode was then analyzed by an EPMA (Electron Probe Micro Analyzer) for the simulated SOFC cell.

Figure 14:
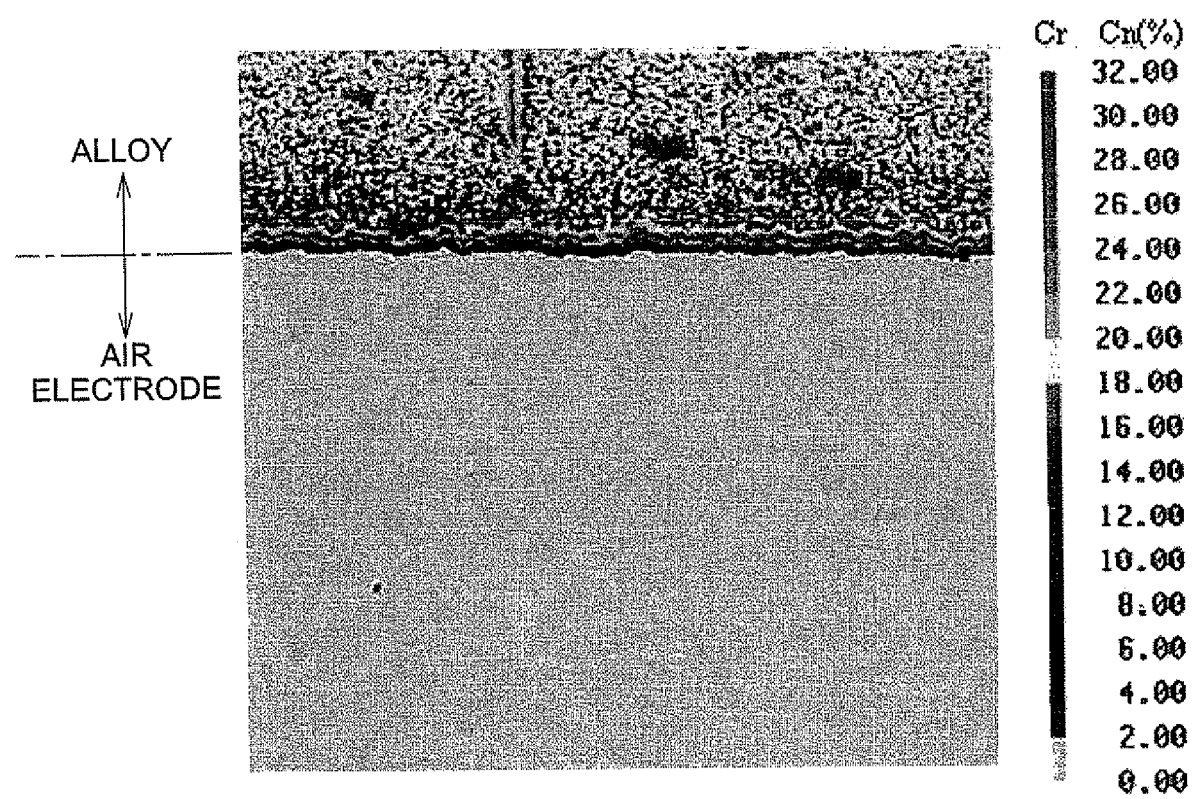
FIG. 14 is a diagram showing the Cr distribution after the firing process of the simulated SOFC cell of Example 8.

FIG. 14 shows the results of analyzing the Cr distribution after the firing process of the simulated SOFC cell of Example 8. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 14, the Cr concentration was approximately 0% in substantially the entire air electrode, and almost no Cr poisoning was identified in the air electrode in the simulated SOFC cell of Example 8 in which the $MgTiO_3$ coating was formed on the alloy surface.

Ninth Embodiment

From the perspective of low oxidative properties, and conductivity and stability at normal temperature, the coating formed on at least the surface of the interconnect 1 that includes the interface 1a (see FIG. 2) with the air electrode 31 is preferably an n-type semiconductor coating in order to induce the abovementioned Cr(VI) oxide suppressing state and suppress Cr poisoning in the first through eighth embodiments described above. Furthermore, from the perspective of low oxidative properties, the n-type semiconductor coating preferably satisfies at least one of the first, second, and third conditions described below.

(First Condition)

An oxide equal to or lower than $WO_3$ at the usage temperature in an Ellingham diagram relating to the standard free energy of formation (equilibrium dissociation pressure of oxygen) is preferred as the n-type semiconductor coating.

Figure 27:
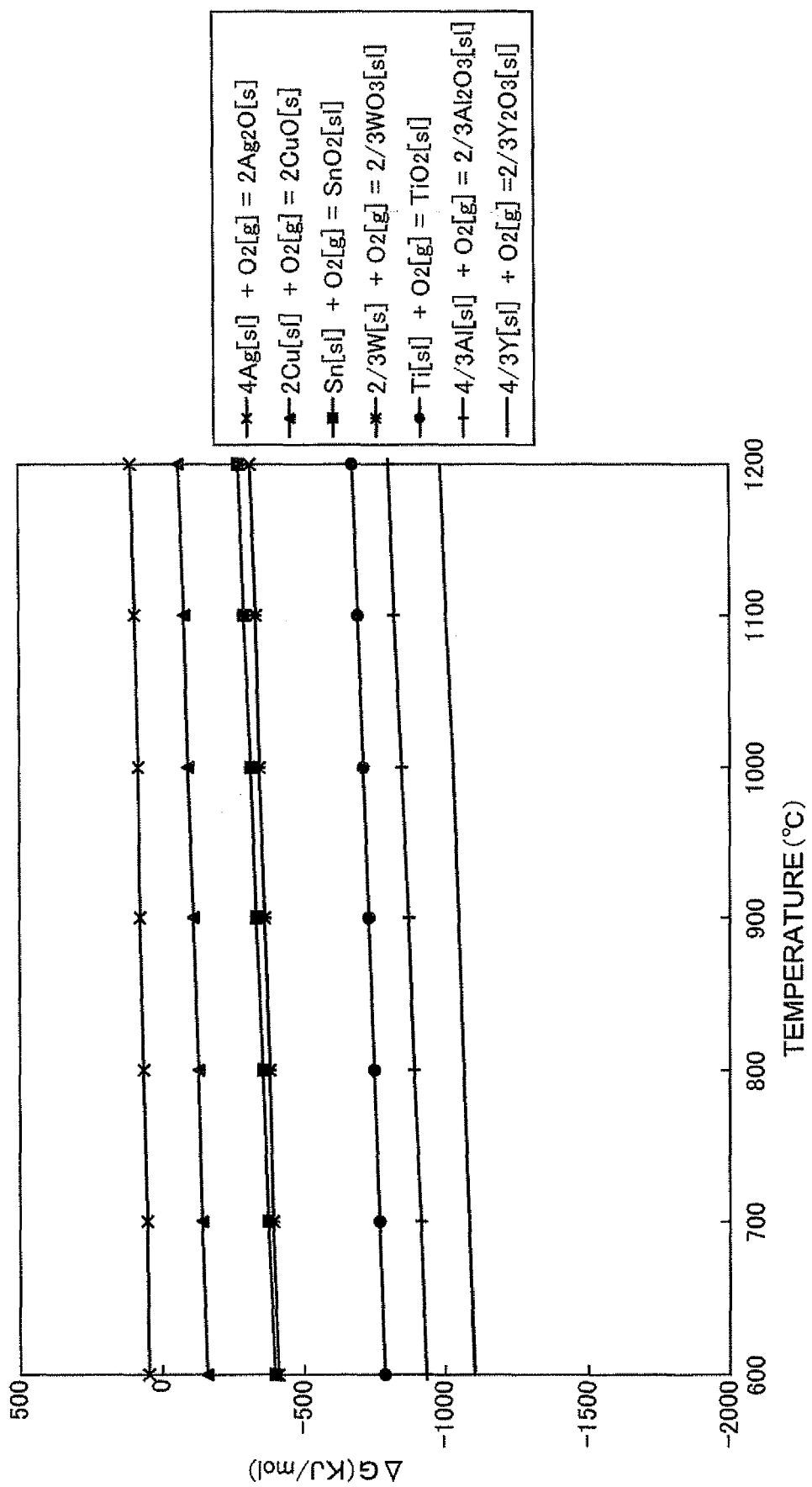
FIG. 27 is a graph showing the standard free energy of formation characteristics of the oxides.

Specifically, Cr poisoning was confirmed in the compounds above $WO_3$ in the Ellingham diagram shown in FIG. 27. It is therefore apparent that the presence of suppressing effects on Cr scattering can be determined by the size of the equilibrium dissociation pressure of oxygen. The reason for this can be estimated to be that the smaller the standard free energy of formation, the smaller the oxidative properties, and oxidation from Cr(III) to Cr(VI) can be suppressed.

The oxides $TiO_2$, $Y_2O_3$, and $WO_3$ are specifically preferred as n-type semiconductor coatings that satisfy the first condition, but $Ta_2O_5$, $Al_2O_3$, BaO, $MoO_2$, $Nb_2O_5$, $ZrO_2$, BeO, MgO, SrO, $In_2O_3$, $SiO_2$, $MgAl_2O_4$, $MgSiO_3$, $CaTiO_3$, $SrTiO_3$, $BaTiO_3$, $Ce_2O_3$, $Sm_2O_3$, $MgTiO_3$, rare earth oxides, and other n-type semiconductors may also be used. However, due to the characteristics of an SOFC, the coefficient of thermal expansion is preferably $7.5 \times 10^{-6}$ to $13.5 \times 10^{-6}/°$ C., and when this range is exceeded, the coating can easily peel off due to thermal expansion and contraction. Also, $TiO_2$, $Y_2O_3$, $WO_3$, $Al_2O_3$, $MoO_2$, $ZrO_2$, BeO, $In_2O_3$, $SiO_2$, $MgAl_2O_4$, $MgSiO_3$, $CaTiO_3$, $SrTiO_3$, $BaTiO_3$, $Ce_2O_3$, $Sm_2O_3$, $MgTiO_3$, or the like is preferred for low toxicity, vapor pressure, and moisture absorbance.

(Second Condition)

An oxide in which the standard electrode potential is minus 0.029 or lower in an aqueous solution (25° C.) is preferred as the n-type semiconductor coating.

Specifically, as a result of evaluating the standard electrode potentials E°/V of various types of oxides, it was confirmed that Cr poisoning occurs when the standard electrode potential E°/V is higher than in $WO_3$, whereas Cr poisoning does not occur when the standard electrode potential E°/V is −0.029 (the standard electrode potential of $WO_3$) or lower, as shown in FIG. 28. It is thus apparent that the presence of suppressing effects on Cr scattering can be determined by the value of the standard electrode potential. The reason for this can be estimated to be that the lower the standard electrode potential, the smaller the oxidative properties, and oxidation from Cr(III) to Cr(VI) can be suppressed.

The oxides $TiO_2$, $Y_2O_3$, and $WO_3$ are specifically preferred as n-type semiconductor coatings that satisfy the second condition, but CdO, $Ta_2O_5$, PbO, $Al_2O_3$, BaO, $MoO_2$, $Nb_2O_5$, $ZrO_2$, BeO, MgO, SrO, $In_2O_3$, $SiO_2$, $MgAl_2O_4$, $MgSiO_3$, $Ce_2O_3$, $CaTiO_3$, $BaTiO_3$, $Sm_2O_3$, $MgTiO_3$, rare earth oxides, and other n-type semiconductors may also be used. However, due to the characteristics of an SOFC, the coefficient of thermal expansion is preferably $7.5 \times 10^{-6}$ to $13.5 \times 10^{-6}/°$ C., and when this range is exceeded, the coating can easily peel off due to thermal expansion and contraction. Also, $TiO_2$, $Y_2O_3$, $WO_3$, $Al_2O_3$, $MoO_2$, $ZrO_2$, BeO, $In_2O_3$, $SiO_2$, $MgAl_2O_4$, $MgSiO_3$, $Ce_2O_3$, $CaTiO_3$, $BaTiO_3$, $Sm_2O_3$, $MgTiO_3$, or the like is preferred for low toxicity, vapor pressure, and moisture absorbance.

(Third Condition)

An oxide for which the vapor pressure at 800° C. is $\frac{1}{100}$ or less of the vapor pressure from $Cr_2O_3$ to $CrO_3$ at the same temperature is preferred as the n-type semiconductor coating.

The reason for this is that when the vapor pressure is high, the coating material scatters to the air electrode and can affect the physical properties.

Figure 30:
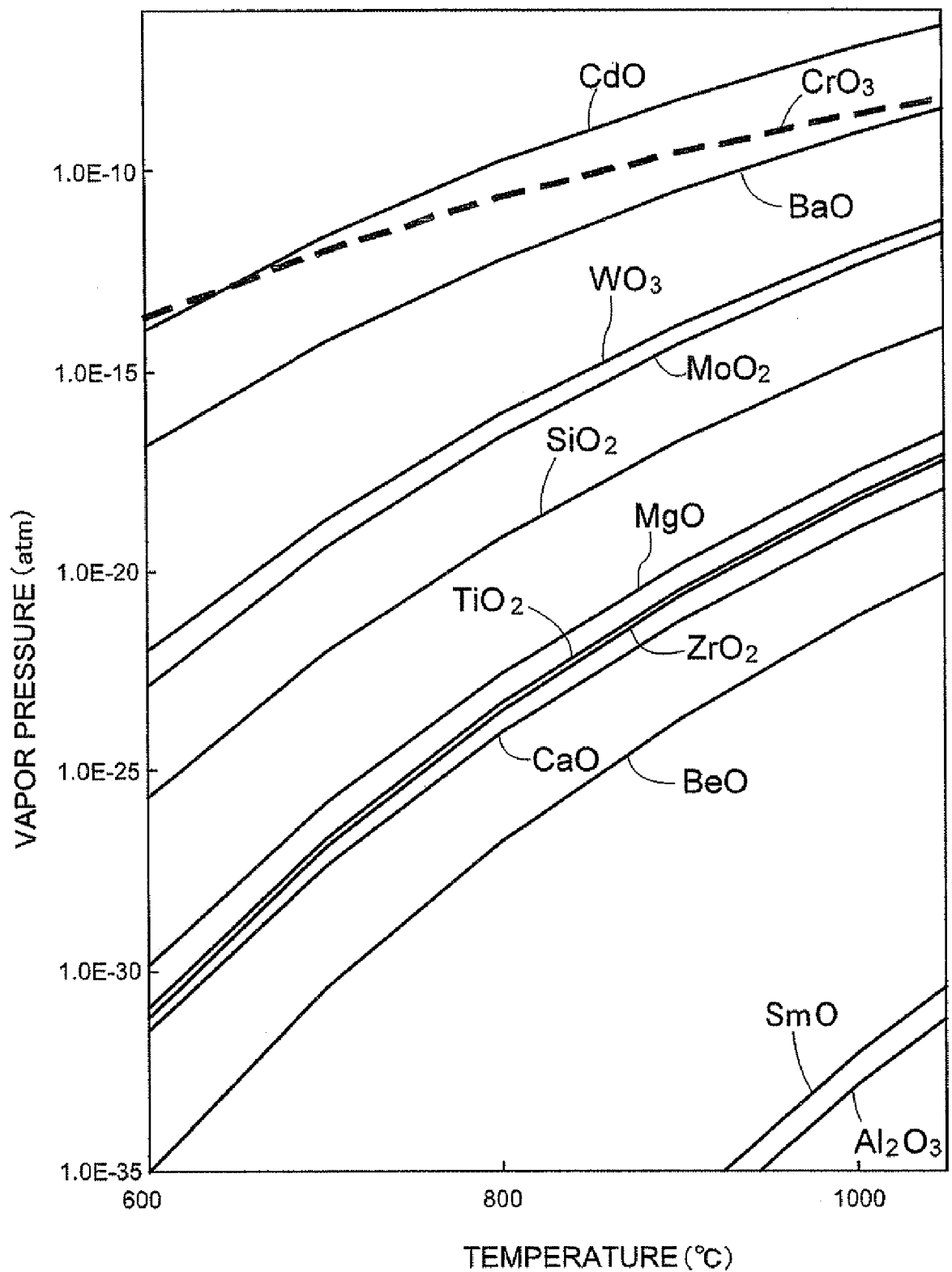
FIG. 30 is a graph showing the vapor pressure characteristics of the oxides.

Therefore, $TiO_2$, $Y_2O_3$, $WO_3$, $Al_2O_3$, $MoO_2$, $ZrO_2$, BeO, MgO, $SiO_2$, $MgAl_2O_4$, $MgSiO_3$, $Ce_2O_3$, $CaTiO_3$, $BaTiO_3$, $Sm_2O_3$, $MgTiO_3$, and the like are preferred as n-type semiconductor coatings that satisfy the third condition, as shown in FIG. 30 (only a portion are shown). The vapor pressure of $CaTiO_3$, which is a composite oxide of CaO and $TiO_2$, is estimated not to exceed that either one of the oxides having the higher vapor pressure, the vapor pressure is estimated to be equal to or lower than the vapor pressure of $TiO_2$. In the same manner, the vapor pressure of $BaTiO_3$, which is a composite oxide of BaO and $TiO_2$, is estimated to be equal to or lower than the vapor pressure of BaO, and the vapor pressure of $MgTiO_3$, which is a composite oxide of MgO and $TiO_2$, is estimated to be equal to or lower than the vapor pressure of MgO.

For coatings of n-type semiconductors that satisfy the abovementioned conditions and have high resistance, the resistance can be reduced by doping.

For example, the resistance of $TiO_2$ can be reduced by doping with an oxide of Nb or the like.

The resistance of $BaTiO_3$ can also be reduced by doping with an oxide of La, Sm, Nb, Ta, Sb, or the like. A sintered compact was obtained by a process in which a powder having a composition such as those shown in Table 1 below was fabricated and subjected to uniaxial pressing and cold isostatic pressing (CIP), and then fired for two hours at a firing temperature of 1300° C. in an air atmosphere. The conductivity at 850° C., 750° C., and 650° C. was measured in an air atmosphere by a four terminal method for a measurement sample cut from the sintered compact. The results are shown in Table 1 below.

TABLE 1

| | Conductivity (S/cm) | | |
|---|---|---|---|
| Powder Composition | 850° C. | 750° C. | 650° C. |
| I: Powder in which 0.26% of $ZrO_2$ was mixed with $Ti_{0.99875}Nb_{0.00125}O_2$ | 0.353 | 0.377 | 0.392 |
| II: Powder in which 0.26% of $ZrO_2$ was mixed with $Ti_{0.9995}Ta_{0.0005}O_2$ | 0.1 | 0.09 | 0.0821 |
| III: $BaTi_{0.9}Nb_{0.1}O_3$ powder | 0.0306 | 0.0255 | 0.0205 |
| IV: $BaTi_{0.9875}Nb_{0.0125}O_3$ powder | $4 \times 10^{-4}$ | $7.31 \times 10^{-5}$ | $8.31 \times 10^{-6}$ |

The surface resistance of each thin film when a 10 μm thin film is formed on the surface of the alloy can be approximated as the values shown in Table 2 below.

TABLE 2

| Powder Composition | Thin-film Resistance (m$\Omega \cdot$ cm$^2$) | | |
|---|---|---|---|
| | 850° C. | 750° C. | 650° C. |
| I: Powder in which 0.26% of ZrO$_2$ was mixed with Ti$_{0.99875}$Nb$_{0.00125}$O$_2$ | 2.83 | 2.65 | 2.55 |
| II: Powder in which 0.26% of ZrO$_2$ was mixed with Ti$_{0.9995}$Ta$_{0.0005}$O$_2$ | 10 | 11.1 | 12.2 |
| III: BaTi$_{0.9}$Nb$_{0.1}$O$_3$ powder | 32.7 | 39.1 | 48.8 |
| IV: BaTi$_{0.9875}$Nb$_{0.0125}$O$_3$ powder | 2500 | 13700 | 120000 |

According to these results, a reduction of resistance may be anticipated by doping TiO$_2$ and BaTiO$_3$ with trace amounts of elements.

In the case of TiO$_2$, the resistance can also be reduced by using a Ti(IV) and Ti(III) oxide mixture.

The abovementioned sputtering methods, vapor deposition, CVD and other dry-process film formation methods, or sol-gel methods and other wet-process film formation method form a dense and thin coating having minimal defects or cracking, and are therefore preferred as the film formation method for forming the TiO$_2$ coating, Y$_2$O$_3$ coating, WO$_3$ coating, or other n-type semiconductor coating. Suppressing effects on Cr poisoning can also be obtained to a certain degree through the use of dipping methods and other wet-process film formation methods. The coating also preferably has no transformation, or a minimal degree of coating damage due to transformation during heating to the firing temperature. In the n-type semiconductor coating, TiO$_2$, Y$_2$O$_3$, WO$_3$, SiO$_2$, CaTiO$_3$, BaTiO$_3$, Sm$_2$O$_3$, and MgTiO$_3$ are not necessarily used singly in the coating, and suppressing effects on Cr poisoning may be obtained even when a plurality of types of coating is combined.

Example 9

A description is given below of the experimental results of observing the Cr distribution in a cross-section of the vicinity of the joint portion between the alloy and the air electrode in a simulated SOFC cell (Example 9) manufactured by a process in which a Al$_2$O$_3$ coating as an n-type semiconductor coating that satisfies the above-mentioned first condition, second condition, and third condition was formed by an Al diffusion process on the surface of the alloy used in the interconnect or the like prior to the firing process.

In the simulated SOFC cell of Example 9, the alloy was an Fe—Cr-based alloy (Cr content: 22 wt %), and the air electrode was (La, Sr) (Co, Fe)O$_3$.

In the present experiment, the simulated SOFC cell of Example 9 was fired for two hours at a firing temperature of 1000° C. to 1150° C. in an air atmosphere, and then left for 200 hours in a state of continuous direct-current application of 0.5 A/cm$^2$ at an operating temperature of 800° C. to simulate operational conditions. The Cr distribution in a cross-section near the joint portion of the alloy and the air electrode was then analyzed by an EPMA (Electron Probe Micro Analyzer) for the simulated SOFC cell.

FIG. 15(a) shows the results of analyzing the Cr distribution after leaving the simulated SOFC cell of Example 9 for 200 hours in a state of continuous direct-current application of 0.5 A/cm$^2$ at 800° C. to simulate operating conditions, subsequent to the firing process; and FIG. 15(b) shows the results of analyzing the Al distribution after leaving the simulated SOFC cell of Example 9 for 200 hours in a state of continuous direct-current application of 0.5 A/cm$^2$ at 800° C. to simulate operating conditions, subsequent to the firing process. In FIG. 15(a), the Cr concentration in the alloy is approximately 22%, and the Cr concentration of the region having the lightest color in the air electrode is substantially 0% (the light-gray region in the air electrodes shown in the diagrams). In FIG. 15(b), it is apparent that the Al$_2$O$_3$ coating on the alloy surface has a thickness of approximately 6 μm. In the diagrams showing these distributions, the photographs show an area approximately 130 μm across.

According to the experimental results as shown in FIG. 15(a), the Cr concentration was approximately 0% in substantially the entire air electrode, and almost no Cr poisoning was identified in the air electrode in the simulated SOFC cell of Example 9 in which the Al diffusion process was applied to the alloy surface.

After the firing process was performed, the simulated SOFC cell of Example 9 was subjected to conduction testing in which a continuous direct-current flow of 0.96 A/cm$^2$ at 800° C. was maintained for 200 hours to simulate operational conditions. As a result, in the simulated SOFC cell of Example 9 in which the Al diffusion process was applied on the alloy surface, since the Al$_2$O$_3$ coating was thick, the surface resistance (200 mΩ·cm$^2$) was higher than in the simulated SOFC cell of Example 2 in which the Y$_2$O$_3$ coating was formed on the alloy surface.

Comparative Examples 3, 4, and 5

A description is given below of the experimental results of observing the Cr distribution in a cross-section of the vicinity of the joint portion between the alloy and the air electrode in a simulated SOFC cell (Comparative Example 3) manufactured by a process in which an SnO$_2$ coating as an n-type semiconductor coating that does not satisfy the first and second conditions described above is formed by a dry-process film formation method on the surface of the alloy used in the interconnect or the like prior to the firing process, a simulated SOFC cell (Comparative Example 4) manufactured by a process in which an Ag$_2$O coating as an n-type semiconductor coating that does not satisfy the first and second conditions described above is formed in the same manner, and a simulated SOFC cell (Comparative Example 5) manufactured by a process in which a CuO coating as an n-type semiconductor coating that does not satisfy the first and second conditions described above is formed in the same manner, as comparative examples other than Comparative Examples 1 and 2 described above.

In the simulated SOFC cells of Comparative Example 3, Comparative Example 4, and Comparative Example 5, the alloy was an Fe—Cr-based alloy (Cr content: 22 wt %), and the air electrode was (La, Sr) (Co, Fe)O$_3$.

In the simulated SOFC cells of Comparative Examples 3 and 4, a reactive direct-current magnetron sputtering method was used as the dry-process film formation method for forming the SnO$_2$ coating or the Ag$_2$O coating on the alloy surface, and the thicknesses of the SnO$_2$ coating and the Ag$_2$O coating were 0.8 μm.

In the simulated SOFC cell of Comparative Example 5, a Cu layer formed on the alloy surface was oxidized during firing and estimated to be present in the form of CuO, plating was used as the film formation method for forming the Cu coating on the alloy surface, and the thickness of the Cu coating was 5 μm.

The simulated SOFC cells of Comparative Examples 3, 4, and 5 were fired for two hours at a firing temperature of 1000° C. to 1150° C. in an air atmosphere, and then left for 200 hours in a state of continuous direct-current application of 0.5 A/cm² at an operating temperature of 800° C. to simulate operational conditions. The Cr distribution in a cross-section near the joint portion of the alloy and the air electrode was then analyzed by an EPMA (Electron Probe Micro Analyzer) for each simulated SOFC cell.

Figure 24:
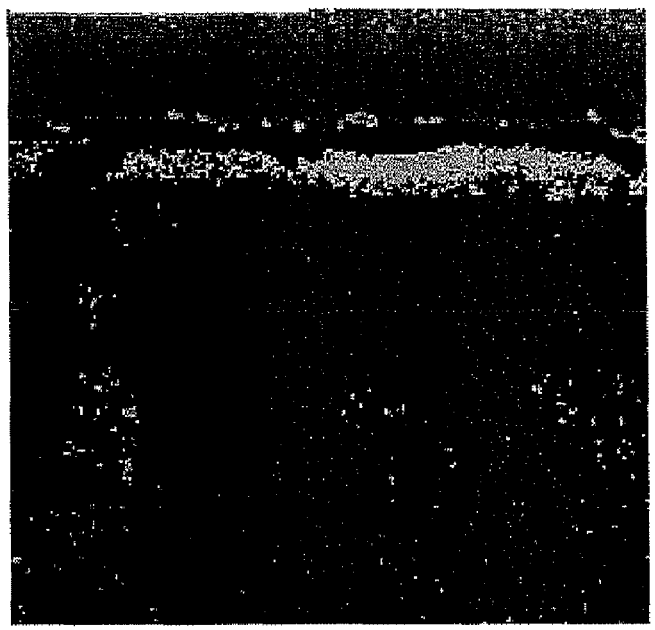
FIG. 24 is a diagram showing the Cr distribution after maintaining the operating temperature of the simulated SOFC cell of Comparative Example 3.
Figure 25:
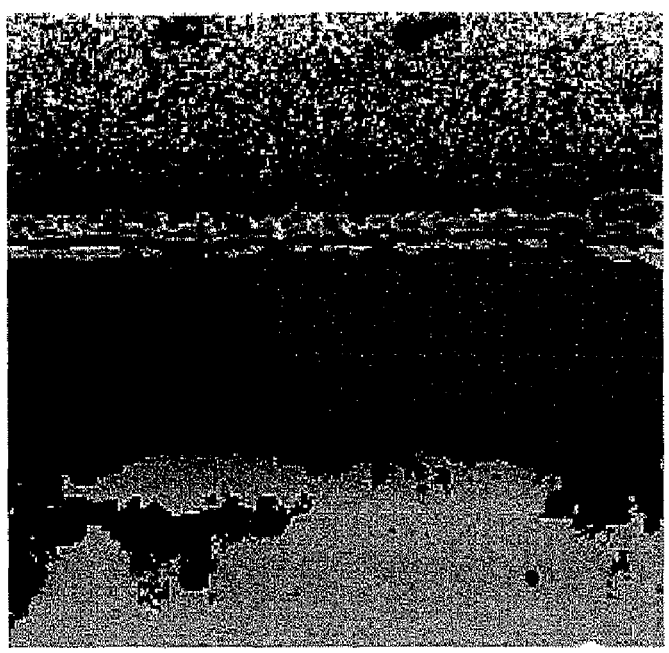
FIG. 25 is a diagram showing the Cr distribution after maintaining the operating temperature of the simulated SOFC cell of Comparative Example 4.
Figure 26:
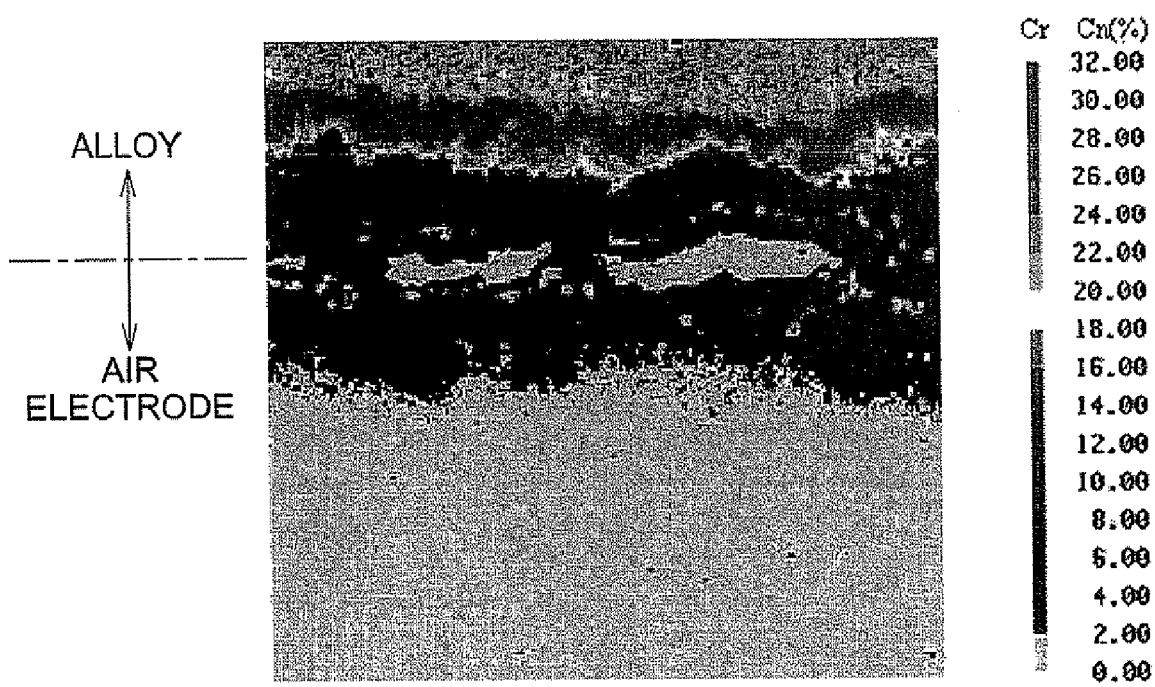
FIG. 26 is a diagram showing the Cr distribution after maintaining the operating temperature of the simulated SOFC cell of Comparative Example 5.

FIG. 24 shows the results of analyzing the Cr distribution after maintaining the operating temperature of the simulated SOFC cell of Comparative Example 3; FIG. 25 shows the results of analyzing the Cr distribution after maintaining the operating temperature of the simulated SOFC cell of Comparative Example 4; and FIG. 26 shows the results of analyzing the Cr distribution after maintaining the operating temperature of the simulated SOFC cell of Comparative Example 5. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

In the simulated SOFC cell of Comparative Example 3 manufactured with the $SnO_2$ coating formed on the alloy surface, the Cr concentration was high, being about 8 to 10% in the entire air electrode, as shown in FIG. 24, and extremely advanced Cr poisoning of the air electrode was confirmed.

In the simulated SOFC cell of Comparative Example 4 manufactured with the $Ag_2O$ coating formed on the alloy surface, the Cr concentration was high, being about 10 to 14% in the region of the air electrode near the alloy, as shown in FIG. 25, and about 8% to 10% in the region somewhat more distant than the first region from the alloy, and extremely advanced Cr poisoning of the air electrode was confirmed.

In the simulated SOFC cell of Comparative Example 5 manufactured with the CuO coating formed on the alloy surface, the Cr concentration was high, being about 10 to 20% in the region of the air electrode near the alloy, as shown in FIG. 26, and advanced Cr poisoning of the air electrode was confirmed.

After the firing process was performed, the simulated SOFC cells of Comparative Examples 4 and 5 were subjected to conduction testing in which a continuous direct-current flow of 0.5 A/cm² at 800° C. was maintained for 200 hours to simulate operational conditions. As a result, in the simulated SOFC cell of Comparative Example 4 in which the $Ag_2O$ coating was formed on the alloy surface, the surface resistance added to the alloy and the $Ag_2O$ coating after 200 hours was 8.7 mΩ·cm². In the simulated SOFC cell of Comparative Example 5 in which the CuO coating was formed on the alloy surface, the surface resistance added to the alloy and the CuO coating after 200 hours was 13 mΩ·cm².

Tenth Embodiment

In the tenth embodiment, the Cr(VI) oxide suppressing state is induced by setting the oxidation parameters of the temperature and oxidation agent partial pressure in the firing process within ranges wherein that Cr(III) oxides are allowed to form, and formation of Cr(VI) oxides is suppressed during the firing process.

Figure 23:
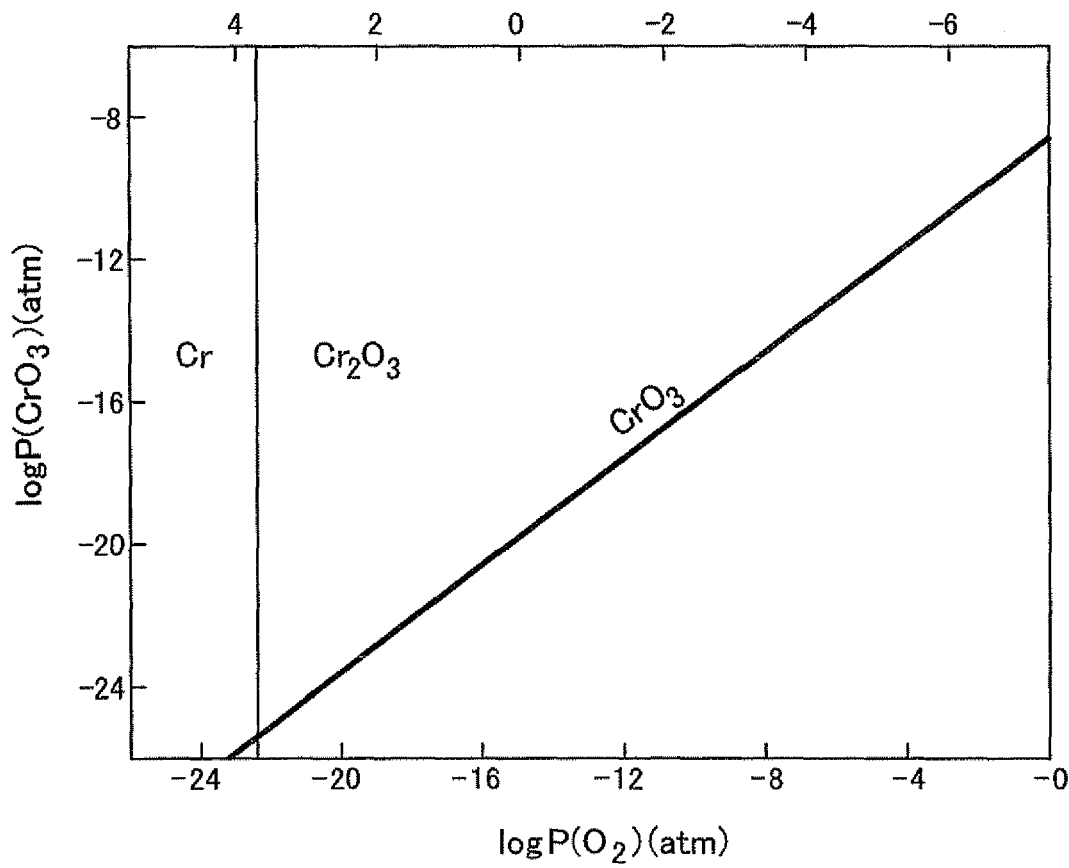
FIG. 23 is a graph showing the vapor pressure characteristics of the Cr(VI) oxide.

Specifically, since the vapor pressure of a Cr(VI) oxide tends to increase the higher the oxidation parameters such as firing temperature and oxidizing agent partial pressure are, Cr poisoning of the air electrode 31 in the firing process is satisfactorily suppressed by limiting the maximum set values of the oxidation parameters in the firing process to within ranges wherein the formation of Cr(VI) oxides is suppressed. For example, when the firing temperature is about 1000° C., the formation of Cr(VI) oxides can be suppressed by referencing the characteristics of the vapor pressure $P(CrO_3)$ of the Cr(VI) oxide shown in FIG. 23 to set the oxygen partial pressure $P(O_2)$ as the oxidizing agent partial pressure to $10^{-2}$ atm or lower, and set the water vapor pressure $P(H_2O)$ to about $10^7$ (i.e., a range in which the vapor pressure of the Cr(VI) oxide is limited to about ⅓₀ or less at atmospheric pressure) or lower in the ratio $P(H_2O)/P(H_2)$ with respect to the hydrogen partial pressure $P(H_2)$.

Furthermore, a protective coating of $Cr_2O_3$ as a Cr(III) oxide having an appropriate thickness is formed on the surface of the interconnect 1 in the firing process by limiting the minimum set values of the oxidation parameters in the firing process to within ranges capable of allowing formation of Cr(III) oxides. For example, when the firing temperature is 1000° C., the formation of Cr(III) oxides can be allowed by referencing FIG. 23 to set the oxygen partial pressure $P(O_2)$ as the oxidizing agent partial pressure to $10^{-23}$ atm or higher, and set the water vapor pressure $P(H_2O)$ to about $10^{-3}$ or higher in the ratio $P(H_2O)/P(H_2)$ with respect to the hydrogen partial pressure $P(H_2)$.

Example 10

A description is given below of the experimental results of observing the Cr distribution in a cross-section of the vicinity of the joint portion between the air electrode and the alloy used in the interconnect or the like in a simulated SOFC cell (Example 10) manufactured as in the tenth embodiment by a process in which the oxidation parameters of the firing temperature and oxidizing agent partial pressure in the firing process were set within ranges for allowing the formation of Cr(III) oxides and suppressing the formation of Cr(VI) oxides, and in a simulated SOFC cell (Comparative Example 2) manufactured by a process in which the firing process was performed in an air atmosphere without setting the oxidation parameters as described above.

In the simulated SOFC cells of Example 10 and Comparative Example 2, the alloy was an Fe—Cr-based alloy (Cr content: 22 wt %), and the air electrode was (La, Sr)(Co, Fe)$O_3$.

In the simulated SOFC cell of Example 10, the settings for the oxidation parameters of the firing process were obtained by performing the firing process in a nitrogen gas atmosphere having an extremely small oxygen or water vapor content. Argon gas or another inert gas may also be used instead of nitrogen gas.

The oxygen partial pressure in the firing process of the simulated SOFC cell of Example 10 was $10^{-7}$ atm, and the water vapor partial pressure was kept to an extremely small value at the lower limit of detection, within ranges for allowing formation of Cr(III) oxides and suppressing formation of Cr(VI) oxides.

The oxygen partial pressure in the firing process of the simulated SOFC cell of Comparative Example 2 was 0.2 atm, the water vapor partial pressure was 0.014 atm, and the oxygen partial pressure and the water vapor partial pressure exceeded values that can suppress the formation of Cr(VI) oxides.

In the present experiment, the simulated SOFC cells of Example 10 and Comparative Example 2 were fired for two hours at a firing temperature of 1000° C. to 1150° C. in a nitrogen atmosphere or an air atmosphere. The Cr distribution in a cross-section near the joint portion of the alloy and the air electrode was then analyzed by an EPMA (Electron Probe Micro Analyzer) for each simulated SOFC cell.

For the simulated SOFC cell of Example 10, after the firing process, the cell was maintained for 670 hours at an operating temperature of 800° C. in an air atmosphere to simulate operational conditions, and the Cr distribution was then analyzed in the same manner as described above.

FIG. 16 shows the results of analyzing the Cr distribution after the firing process of the simulated SOFC cell of Example 10; FIG. 17 shows the results of analyzing the Cr distribution after maintaining the operating temperature of the simulated SOFC cell of Example 10; and FIG. 22 shows the results of analyzing the Cr distribution after the firing process of the simulated SOFC cell of Comparative Example 2. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIG. 16, after the firing process, the Cr concentration was approximately 0% in substantially the entire air electrode, and almost no Cr poisoning was identified in the air electrode in the simulated SOFC cell of Example 10. At the same time, it was confirmed that a protective coating of $Cr_2O_3$ as a Cr(III) oxide was formed in the interface between the alloy and the air electrode.

Furthermore, as shown in FIG. 17, the progress of Cr scattering to the air electrode was slow even after maintenance of the operating temperature in the simulated SOFC cell of Example 10, in which the firing process was performed in a nitrogen gas atmosphere. The slowness of Cr poisoning during operation after the firing process is due to the reduction in temperature from the firing temperature range of about 1000° C. to 1150° C. to the operating temperature of 800° C.

In the simulated SOFC cell of Comparative Example 2 in which the firing process was performed in an air atmosphere, the Cr concentration was high, being approximately 10% to 14% in the region (the dark gray region in the air electrode shown in FIG. 22) of the air electrode near the alloy, as shown in FIG. 22, and about 2% to 10% even in the region somewhat more distant from the alloy, and extremely advanced Cr poisoning of the air electrode was confirmed.

Eleventh Embodiment

In the eleventh embodiment, the Cr(VI) oxide suppressing state is induced by setting the oxidation parameters of the temperature and oxidation agent partial pressure in the firing process within ranges wherein that Cr(III) oxides are allowed to form, and formation of Cr(VI) oxides is suppressed during the firing process, in the same manner as in the tenth embodiment, as well as by setting the abovementioned oxidation parameters within ranges in which reduction of the air electrode is prevented.

Specifically, Cr poisoning of the air electrode 31 in the firing process is satisfactorily suppressed by limiting the maximum set values of the oxidation parameters in the firing process to within ranges wherein the formation of Cr(VI) oxides is suppressed, in the same manner as in the tenth embodiment. For example, when the firing temperature is about 1000° C., the formation of Cr(VI) oxides can be suppressed by referencing the characteristics of the vapor pressure $P(CrO_3)$ of the Cr(VI) oxide shown in FIG. 23 to set the oxygen partial pressure $P(O_2)$ as the oxidizing agent partial pressure to $10^{-2}$ atm or lower, and set the water vapor pressure $P(H_2O)$ to about $10^7$ (i.e., a range in which the vapor pressure of the Cr(VI) oxide is limited to about 1/30 or less at atmospheric pressure) or lower in the ratio $P(H_2O)/P(H_2)$ with respect to the hydrogen partial pressure $P(H_2)$.

Furthermore, reduced performance during operation due to reduction of the constituent members of the SOFC cell that include the air electrode, which is most easily affected by a reducing atmosphere, can be satisfactorily prevented by limiting the minimum set values of the oxidation parameters in the firing process to within ranges for preventing reduction of the air electrode. For example, when the air electrode is $LaCoO_3$-based, the air electrode is not easily reduced when the oxygen partial pressure $P(O_2)$ is $10^{-7}$ atm or higher at the firing temperature of about 1000° C. When the oxygen partial pressure is equal to or higher than this lower limit, a protective coating of $Cr_2O_3$ as a Cr(III) oxide having an appropriate thickness is formed on the surface of the alloy.

Example 11

A description is given below of the experimental results of observing the Cr distribution in a cross-section of the vicinity of the joint portion between the air electrode and the alloy used in the interconnect or the like in a simulated SOFC cell (Example 11) manufactured as in the eleventh embodiment by a process in which the oxidation parameters of the firing temperature and oxidizing agent partial pressure in the firing process were set within ranges for allowing the formation of Cr(III) oxides and suppressing the formation of Cr(VI) oxides, and the abovementioned oxidation parameters were also set within ranges for preventing reduction of the air electrode; and in a simulated SOFC cell (Comparative Example 2) manufactured by a process in which the firing process was performed in an air atmosphere without setting the oxidation parameters as described above.

In the simulated SOFC cells of Example 11 and Comparative Example 2, the alloy was an Fe—Cr—based alloy (Cr content: 22 wt %), and the air electrode was $(La, Sr)(Co, Fe)O_3$.

In the simulated SOFC cell of Example 11, the settings for the oxidation parameters of the firing process were obtained by performing the firing process in an argon gas atmosphere having an extremely small oxygen or water vapor content. Nitrogen gas or another inert gas and non-oxidizing gas may also be used instead of argon gas.

The oxygen partial pressures in the firing process of the simulated SOFC cell of Example 11 were $10^{-5}$ atm, $10^{-4}$ atm, $10^{-3}$ atm, and $10^{-2}$ atm, and the water vapor partial pressure was kept to an extremely small value at the lower limit of detection, within ranges for allowing formation of Cr(III) oxides and suppressing formation of Cr(VI) oxides, as well as within ranges for preventing reduction of the air electrode.

The oxygen partial pressure in the firing process of the simulated SOFC cell of Comparative Example 2 was 0.2 atm, the water vapor partial pressure was 0.014 atm, and the oxygen partial pressure and the water vapor partial pressure exceeded values that can suppress the formation of Cr(VI) oxides.

In the present experiment, the simulated SOFC cells of Example 11 and Comparative Example 2 were fired for two hours at a firing temperature of 1000° C. to 1150° C. in an argon atmosphere or an air atmosphere. The Cr distribution in a cross-section near the joint portion of the alloy and the air electrode was then analyzed by an EPMA (Electron Probe Micro Analyzer) for each simulated SOFC cell.

Figure 18:
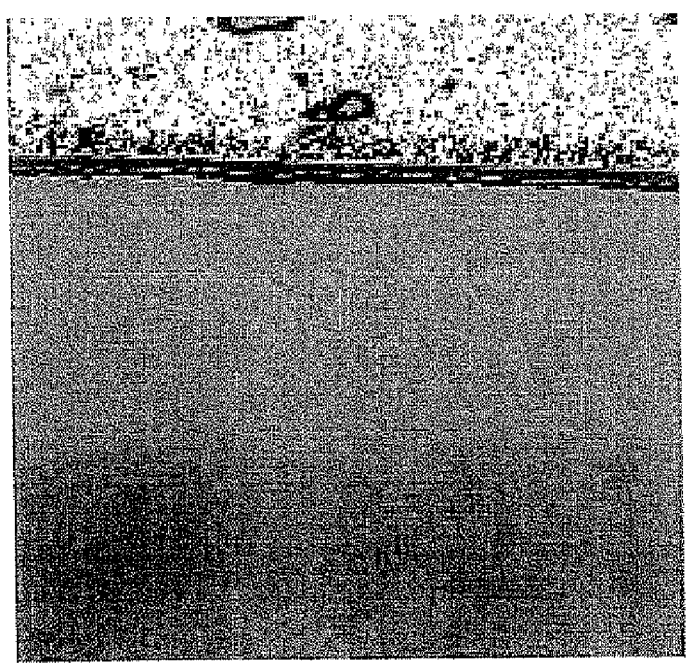
FIG. 18 is a diagram showing the Cr distribution after the firing process at an oxygen partial pressure of $10^{-5}$ atm in the simulated SOFC cell of Example 11.
Figure 19:
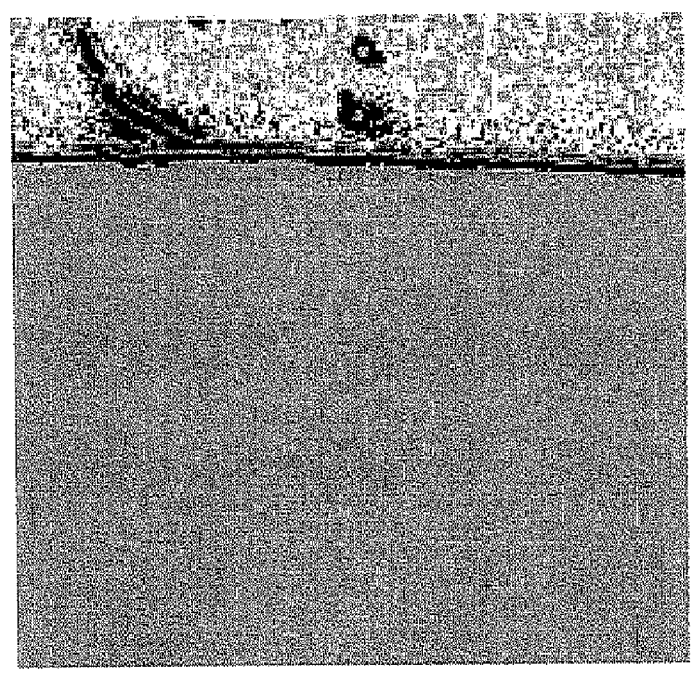
FIG. 19 is a diagram showing the Cr distribution after the firing process at an oxygen partial pressure of $10^{-4}$ atm in the simulated SOFC cell of Example 11.
Figure 20:
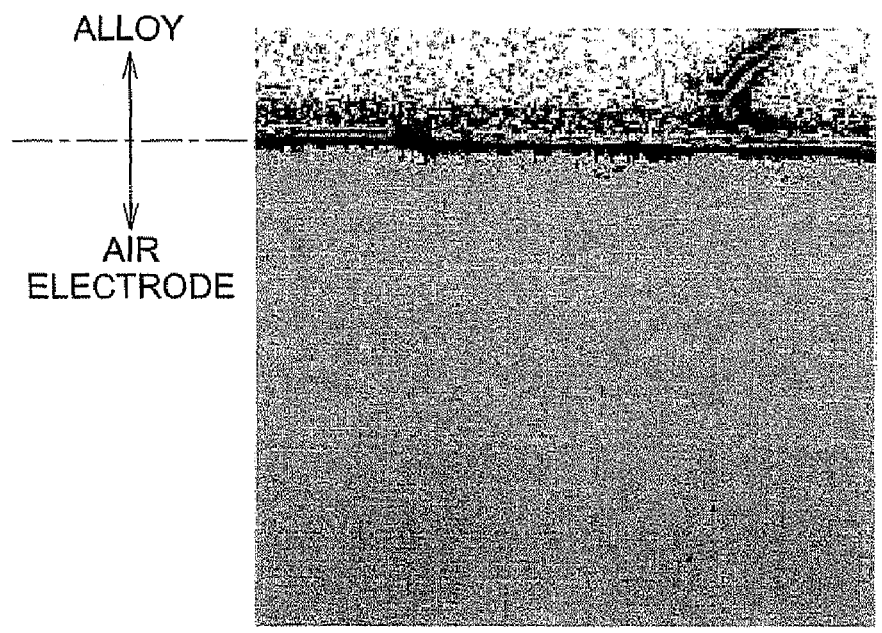
FIG. 20 is a diagram showing the Cr distribution after the firing process at an oxygen partial pressure of $10^{-3}$ atm in the simulated SOFC cell of Example 11.
Figure 21:
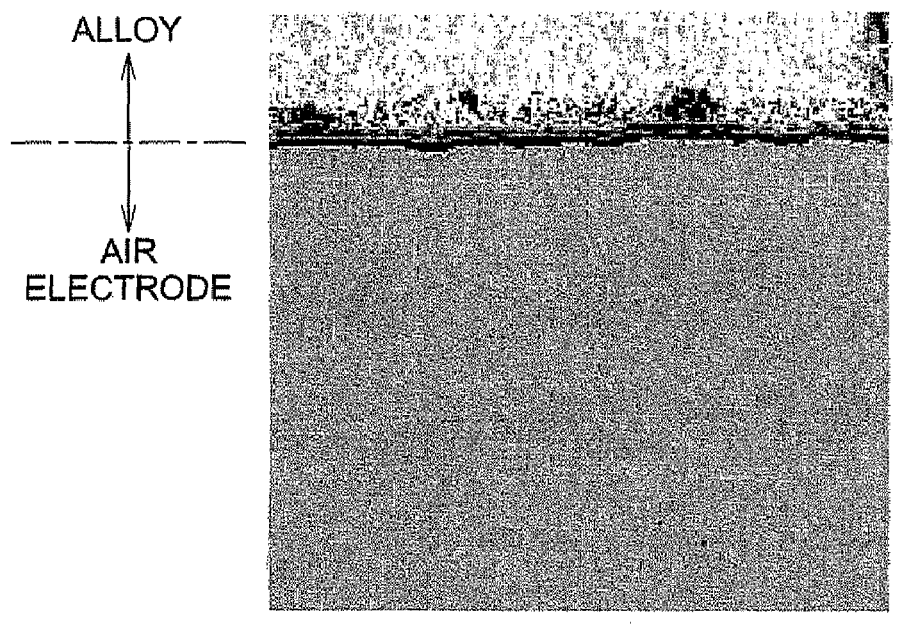
FIG. 21 is a diagram showing the Cr distribution after the firing process at an oxygen partial pressure of $10^{-2}$ atm in the simulated SOFC cell of Example 11.

FIG. 18 shows the results of analyzing the Cr distribution after the firing process at an oxygen partial pressure of $10^{-5}$ atm in the simulated SOFC cell of Example 11; FIG. 19 shows the results of analyzing the Cr distribution after the firing process at an oxygen partial pressure of $10^{-4}$ atm in the simulated SOFC cell of Example 11; FIG. 20 shows the results of analyzing the Cr distribution after the firing process at an oxygen partial pressure of $10^{-3}$ atm in the simulated SOFC cell of Example 11; FIG. 21 shows the results of analyzing the Cr distribution after the firing process at an oxygen partial pressure of $10^{-2}$ atm in the simulated SOFC cell of Example 11; and FIG. 22 shows the results of analyzing the Cr distribution after the firing process of the simulated SOFC cell of Comparative Example 2. In these diagrams, the Cr concentration in the alloy is approximately 22%, and the Cr concentration of the region having the lightest color in the air electrode is substantially 0% (the light-gray region in the air electrodes shown in the diagrams). In the diagrams showing these distributions, the photographs show an area approximately 130 μm across.

According to the experimental results as shown in FIGS. 18 through 21, after the firing process, the Cr concentration was approximately 0% in substantially the entire air electrode, and almost no Cr poisoning was identified in the air electrode in the simulated SOFC cell of Example 11. At the same time, it was confirmed that a protective coating of $Cr_2O_3$ as a Cr(III) oxide was formed in the interface between the alloy and the air electrode.

In the simulated SOFC cell of Comparative Example 2 in which the firing process was performed in an air atmosphere, the Cr concentration was high, being approximately 10% to 14% in the region (the dark gray region in the air electrode shown in FIG. 22) of the air electrode near the alloy, as shown in FIG. 22, and about 2% to 10% even in the region somewhat more distant from the alloy, and extremely advanced Cr poisoning of the air electrode was confirmed.

A description is also given below of the experimental results of observing the Cr distribution in a cross-section of the vicinity of the joint portion between the air electrode and the alloy used in the interconnect or the like in a simulated SOFC cell (Comparative Example 6) manufactured by a process in which the oxygen partial pressure was set slightly higher than in the simulated SOFC cell of Example 11, and the firing process was performed.

Testing was performed under conditions in which the oxygen partial pressure in the firing process of the simulated SOFC cell of Comparative Example 6 was $2.5\times10^{-2}$ atm, $5\times10^{-2}$ atm, $1\times10^{-1}$ atm, and $2\times10^{-1}$ atm, and the water vapor partial pressure was limited to an extremely low value at the lower limit of detection. FIG. 29(a) shows the results of analyzing the Cr distribution after the firing process at an oxygen partial pressure of $2.5\times10^{-2}$ atm; FIG. 29(b) shows the results of analyzing the Cr distribution after the firing process at an oxygen partial pressure of $5\times10^{-2}$ atm; FIG. 29(c) shows the results of analyzing the Cr distribution after the firing process at an oxygen partial pressure of $1\times10^{-1}$ atm; and FIG. 29(d) shows the results of analyzing the Cr distribution after the firing process at an oxygen partial pressure of $2\times10^{-1}$ atm.

As shown in FIG. 29, the Cr concentration was relatively high in the region (the dark gray region in the air electrode shown in FIG. 29) near the alloy, Cr scattering was not suppressed, and advanced Cr poisoning of the air electrode was confirmed at all the oxygen partial pressures.

Based on these results, the oxygen partial pressure of the firing atmosphere is preferably within the range of $10^{-7}$ atm to $10^{-2}$ atm.

Twelfth Embodiment

The twelfth embodiment is an embodiment of an SOFC cell manufacturing method for preventing joint defects of the air electrode with respect to the alloy.

Specifically, when the firing process in which the oxidation parameters are controlled as described above is performed on a mixture of an organic binder and a powder of the air electrode applied to the alloy, combustion of the organic binder is sometimes incomplete, carbon remains, and the air electrode is sometimes unsatisfactorily joined to the alloy.

Figure 31:
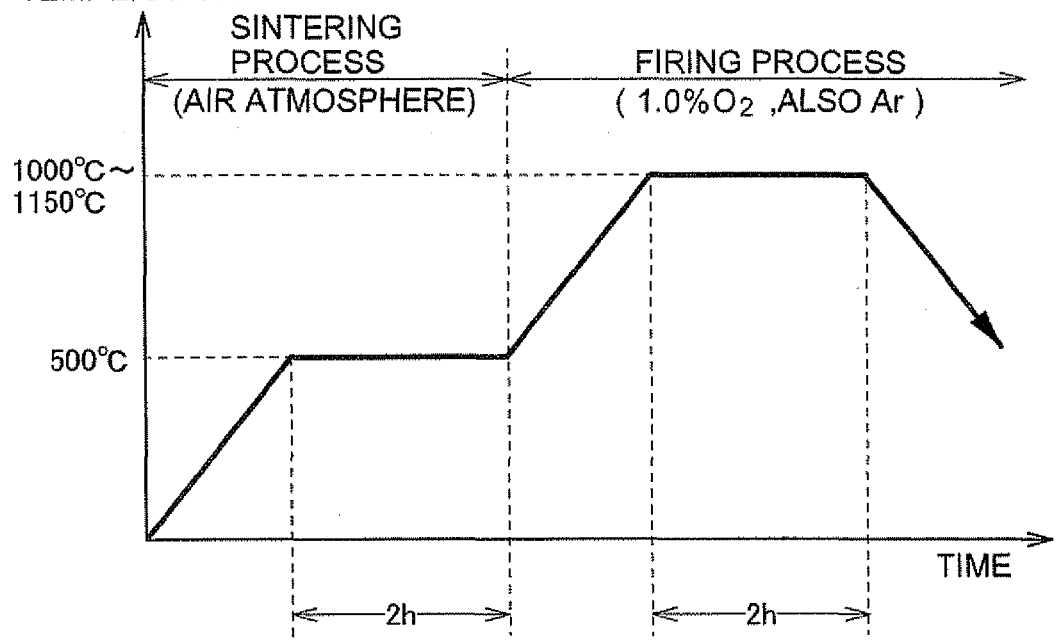
FIG. 31 is a graph showing the temperature profile in the binder ignition process and the firing process.

Therefore, in the method of the present embodiment, a binder ignition process is performed for heating for two hours, for example, at a heating temperature (e.g., about 500° C.) within a range less than the firing temperature in the firing process and equal to or higher than the binder ignition temperature in an oxidizing agent atmosphere (e.g., an air atmosphere), after which the firing process is performed for firing for two hours at a firing temperature of 1000° C. to 1150° C. in an argon gas atmosphere having an extremely small (e.g., 1%) oxygen content, in the same manner as in the firing process heretofore described, as shown in FIG. 31.

Experimentation confirmed that the organic binder included in the mixture is thus satisfactorily oxidized and combusted in the binder ignition process described above, whereby the abovementioned joint defects due to residual organic binder components is prevented.

Figure 32:
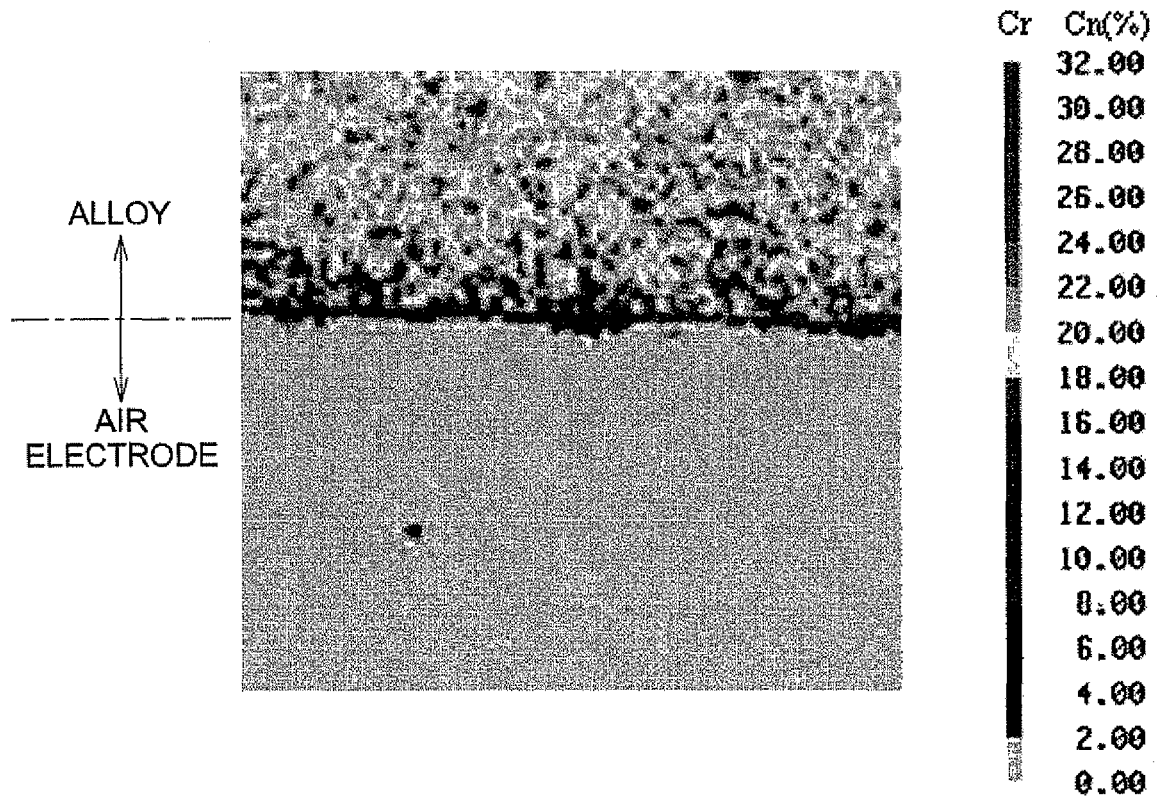
FIG. 32 is a diagram showing the Cr distributions after the firing process in the simulated SOFC cell after the binder ignition process and the firing process.

In the simulated SOFC cell manufactured using the binder ignition process described above, since the heating temperature was kept lower than the firing temperature of the firing process, the Cr concentration was approximately 0% in substantially the entire air electrode, and almost no Cr poisoning of the air electrode was identified, as shown in FIG. 32.

INDUSTRIAL APPLICABILITY

The SOFC cell and manufacturing method thereof according to the present invention can be effectively applied as an SOFC cell and manufacturing method thereof whereby the occurrence of Cr poisoning of the air electrode can be satisfactorily suppressed in an SOFC cell formed by joining together an air electrode with a Cr-containing alloy or the like.

The invention claimed is:

1. A method for manufacturing a cell for a solid oxide fuel cell in which an air electrode and a Cr-containing alloy or oxide are joined together; said method for manufacturing a cell for a solid oxide fuel cell characterized in that in a firing process in which said air electrode and said alloy or oxide are fired in a state of being joined together, a Cr(VI) oxide suppressing state is induced for suppressing the occurrence of an oxide of Cr(VI) in said alloy or oxide, characterized in that said Cr(VI) oxide suppressing state is induced by performing a coating process whereby an n-type semiconductor coating composed of an oxide in which a standard free energy of formation is equal to or less than that of $WO_3$ is formed on a surface of said alloy or oxide prior to performing said firing process.

2. The method for manufacturing a solid oxide fuel cell according to claim 1, characterized in that the n-type semiconductor coating formed in said coating process is at least one of a $TiO_2$ coating, a $Y_2O_3$ coating, a $WO_3$ coating, an $SiO_2$ coating, a $CaTiO_3$ coating, a $BaTiO_3$ coating, an $Sm_2O_3$ coating, and an $MgTiO_3$ coating.

3. The method for manufacturing a solid oxide fuel cell according to claim 1, characterized in comprising:
performing a binder ignition process wherein, in a state in which a mixture of an organic binder and a powder of said air electrode is applied to said alloy or oxide, the alloy or oxide is heated in an oxidizing agent atmosphere at a heating temperature less than the firing temperature in said firing process, and said organic binder is fired; and the oxidizing agent partial pressure is then reduced and said firing process performed.

4. A method for manufacturing a solid oxide fuel cell in which an air electrode and a Cr-containing alloy or oxide are joined together; said method for manufacturing a cell for a solid oxide fuel cell characterized in that in a firing process in which said air electrode and said alloy or oxide are fired in a state of being joined together, a Cr(VI) oxide suppressing state is induced for suppressing the occurrence of an oxide of Cr(VI) in said alloy or oxide, characterized in that said Cr(VI) oxide suppressing state is induced by performing a coating process whereby an n-type semiconductor coating composed of an oxide in which a standard electrode potential in an aqueous solution is −0.029 V or lower is formed on a surface of said alloy or oxide prior to performing said firing process.

5. The method for manufacturing a solid oxide fuel cell according to claim 4, characterized in that the n-type semiconductor coating formed in said coating process is at least one of a $TiO_2$ coating, a $Y_2O_3$ coating, a $WO_3$ coating, an $SiO_2$ coating, a $CaTiO_3$ coating, a $BaTiO_3$ coating, an $Sm_2O_3$ coating, and an $MgTiO_3$ coating.

6. A method for manufacturing a solid oxide fuel cell in which an air electrode and a Cr-containing alloy or oxide are joined together; said method for manufacturing a cell for a solid oxide fuel cell characterized in that in a firing process in which said air electrode and said alloy or oxide are fired in a state of being joined together, a Cr(VI) oxide suppressing state is induced for suppressing the occurrence of an oxide of Cr(VI) in said alloy or oxide, characterized in that said Cr(VI) oxide suppressing state is induced by setting oxidation parameters of an oxidizing agent partial pressure and a firing temperature in said firing process within ranges for suppressing formation of an oxide of Cr(VI) and allowing formation of an oxide of Cr(III).

7. The method for manufacturing a solid oxide fuel cell according to claim 6, wherein said oxidation parameters are set within ranges for preventing reduction of said air electrode.

8. The method for manufacturing a solid oxide fuel cell according to claim 6, characterized in that an oxygen partial pressure and a water vapor partial pressure are set as said oxidizing agent partial pressure.

9. A cell for a solid oxide fuel cell in which an air electrode and a Cr-containing alloy or oxide are joined together; said cell for a solid oxide fuel cell comprising:
an n-type semiconductor coating composed of an oxide in which a standard free energy of formation is equal to or less than that of $WO_3$, formed on a surface of said alloy or oxide.

10. The cell for a solid oxide fuel cell according to claim 9, wherein said n-type semiconductor coating is at least one of a $TiO_2$ coating, a $Y_2O_3$ coating, a $WO_3$ coating, an $SiO_2$ coating, a $CaTiO_3$ coating, a $BaTiO_3$ coating, an $Sm_2O_3$ coating, and an $MgTiO_3$ coating.

11. A cell for a solid oxide fuel cell in which an air electrode and a Cr-containing alloy or oxide are joined together; said cell for a solid oxide fuel cell comprising:
an n-type semiconductor coating composed of an oxide in which a standard electrode potential in an aqueous solution is −0.029 V or lower, the coating being formed on a surface of said alloy or oxide.

12. The cell for a solid oxide fuel cell according to claim 11, wherein said n-type semiconductor coating is at least one of a $TiO_2$ coating, a $Y_2O_3$ coating, a $WO_3$ coating, an $SiO_2$ coating, a $CaTiO_3$ coating, a $BaTiO_3$ coating, an $Sm_2O_3$ coating, and an $MgTiO_3$ coating.

\* \* \* \* \*